United States Patent
Lim et al.

(10) Patent No.: US 12,468,076 B2
(45) Date of Patent: Nov. 11, 2025

(54) COLOR FILTER ARRAY, IMAGE SENSOR, CAMERA AND ELECTRONIC DEVICE

(71) Applicant: Samsung Electronics Co., Ltd., Suwon-si (KR)

(72) Inventors: Seon-Jeong Lim, Yongin-si (KR); Sangwon Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 490 days.

(21) Appl. No.: 17/876,089

(22) Filed: Jul. 28, 2022

(65) Prior Publication Data

US 2023/0048483 A1   Feb. 16, 2023

(30) Foreign Application Priority Data

Aug. 11, 2021 (KR) .................. 10-2021-0105762

(51) Int. Cl.
*G02B 5/20* (2006.01)

(52) U.S. Cl.
CPC ............. *G02B 5/201* (2013.01); *G02B 5/208* (2013.01)

(58) Field of Classification Search
CPC ....... G02B 5/201; G02B 5/208; Y02E 10/549; H01L 27/14621; H01L 27/1461; H01L 27/14643; H01L 27/14685
See application file for complete search history.

(56) References Cited

U.S. PATENT DOCUMENTS

| | | | |
|---|---|---|---|
| 6,252,345 B1 * | 6/2001 | Ito | H01J 9/20 313/461 |
| 6,379,992 B2 | 4/2002 | Jo | |

(Continued)

FOREIGN PATENT DOCUMENTS

| | | |
|---|---|---|
| JP | 6456704 B2 | 1/2019 |
| JP | 6634125 B2 | 1/2020 |

(Continued)

OTHER PUBLICATIONS

Ma et al. "The Color Accuracy of the Kubelka-Munk Theory" (Year: 1987).*

(Continued)

*Primary Examiner* — Bumsuk Won
*Assistant Examiner* — John Curtis Sipes
(74) *Attorney, Agent, or Firm* — HARNESS, DICKEY & PIERCE, P.L.C.

(57) ABSTRACT

A color filter array includes a partition wall defining a plurality of sections partitioned from each other by the partition wall, the plurality of sections including first, second, and third sections, and first, second, and third color filters in separate, respective sections of the first, second, and third sections and configured to selectively transmit light in first, second, and third wavelength spectra, respectively, which are different from each other and belonging to a visible light wavelength spectrum, each separate color filter of the first, second, and third color filters is in a separate section of the first, second, or third sections and configured to selectively transmit light in a separate wavelength spectrum of the first, second, or third wavelength spectra, includes a colored layer in the separate section and including a colorant defining the separate wavelength spectrum, and a transparent resin layer on the colored layer in the separate section.

18 Claims, 25 Drawing Sheets

(56) References Cited

U.S. PATENT DOCUMENTS

| | | | |
|---|---|---|---|
| 6,500,485 B1* | 12/2002 | Yamaguchi | B41J 2/01 |
| | | | 427/256 |
| 7,528,001 B2 | 5/2009 | Kim | |
| 7,737,044 B2 | 6/2010 | Fukuyoshi et al. | |
| 8,004,028 B2 | 8/2011 | Fukuyoshi et al. | |
| 9,564,462 B2 | 2/2017 | Hsu et al. | |
| 9,899,439 B2 | 2/2018 | Miyashita | |
| 11,815,758 B2* | 11/2023 | Mai | G02F 1/1368 |
| 2004/0146791 A1* | 7/2004 | Sakurada | G02B 5/201 |
| | | | 430/7 |
| 2007/0058068 A1 | 3/2007 | Fukuyoshi et al. | |
| 2007/0155086 A1 | 7/2007 | Kim | |
| 2008/0233493 A1* | 9/2008 | Ishizeki | G03F 7/2024 |
| | | | 430/7 |
| 2008/0272452 A1 | 11/2008 | Hwang | |
| 2009/0002620 A1* | 1/2009 | Yamashita | C09J 153/00 |
| | | | 524/505 |
| 2009/0206435 A1 | 8/2009 | Fukuyoshi et al. | |
| 2010/0253819 A1* | 10/2010 | Yokozawa | H01L 27/14621 |
| | | | 348/E5.091 |
| 2013/0342927 A1* | 12/2013 | Hino | G02B 5/20 |
| | | | 430/7 |
| 2016/0079292 A1 | 3/2016 | Miyashita | |
| 2016/0099270 A1 | 4/2016 | Hsu et al. | |
| 2017/0010529 A1 | 1/2017 | Aoyagi | |
| 2017/0124373 A1* | 5/2017 | Liao | H01L 27/14683 |
| 2018/0269428 A1* | 9/2018 | Uchida | H10K 59/878 |
| 2018/0346729 A1* | 12/2018 | Miyake | C07D 333/66 |
| 2019/0339422 A1 | 11/2019 | Lu et al. | |
| 2020/0258929 A1* | 8/2020 | Imoto | H01L 27/14685 |
| 2021/0066384 A1* | 3/2021 | Greco | H10K 85/50 |
| 2021/0139690 A1* | 5/2021 | Oya | C08F 265/06 |
| 2021/0163634 A1* | 6/2021 | Miyata | G02B 5/22 |
| 2021/0231840 A1 | 7/2021 | Lu et al. | |
| 2021/0332173 A1* | 10/2021 | Mizuno | C08F 120/14 |

FOREIGN PATENT DOCUMENTS

| | | |
|---|---|---|
| JP | 6716911 B2 | 7/2020 |
| KR | 2001-0061339 A | 7/2001 |
| KR | 2004-0003166 A | 1/2004 |
| KR | 10-2004-0045304 A | 6/2004 |
| KR | 10-0731132 B1 | 6/2007 |
| KR | 100829377 B1 | 5/2008 |
| KR | 2008-0097714 A | 11/2008 |
| KR | 101067930 B1 | 9/2011 |
| KR | 10-2014-0041447 A | 4/2014 |
| KR | 2016-0032584 A | 3/2016 |
| KR | 10-2018-0104727 A | 9/2018 |
| KR | 102094372 B1 * | 3/2020 |
| KR | 10-2021-0022710 A | 3/2021 |
| KR | 10-2021-0093975 A | 7/2021 |

OTHER PUBLICATIONS

Sicher et al. "Structural color from solid-state polymerization-induced phase separation", Feb. 9, 2021 (Year: 2021).*

Poole et al. "The optical applications of 3D sub-wavelength block-copolymer nanostructure functional materials" (Year: 2015).*

Onozawa, et al., "A MOS Image Sensor With a Digital-Microlens", IEEE Transactions on Electron Devices, vol. 55, No. 4, pp. 986-991, Apr. 2008.

Office Action for corresponding Korean Patent Application No. 10-2021-0105762 dated Jul. 21, 2025 and English translation thereof.

* cited by examiner

[FIG. 1]
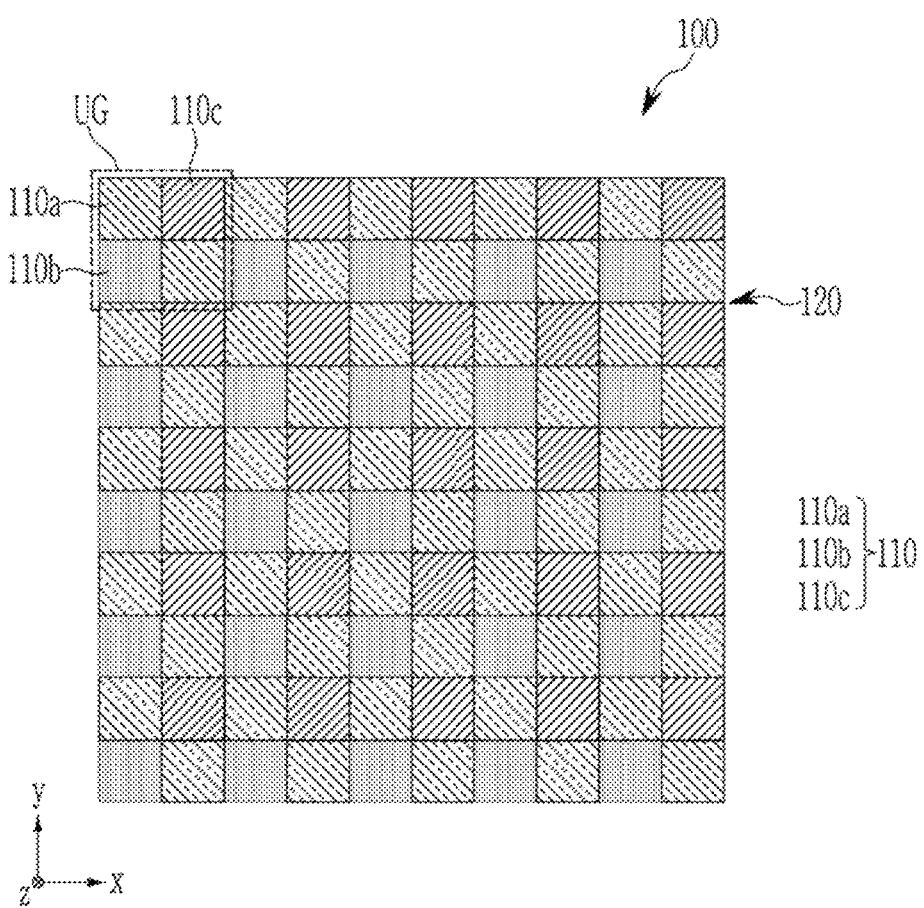

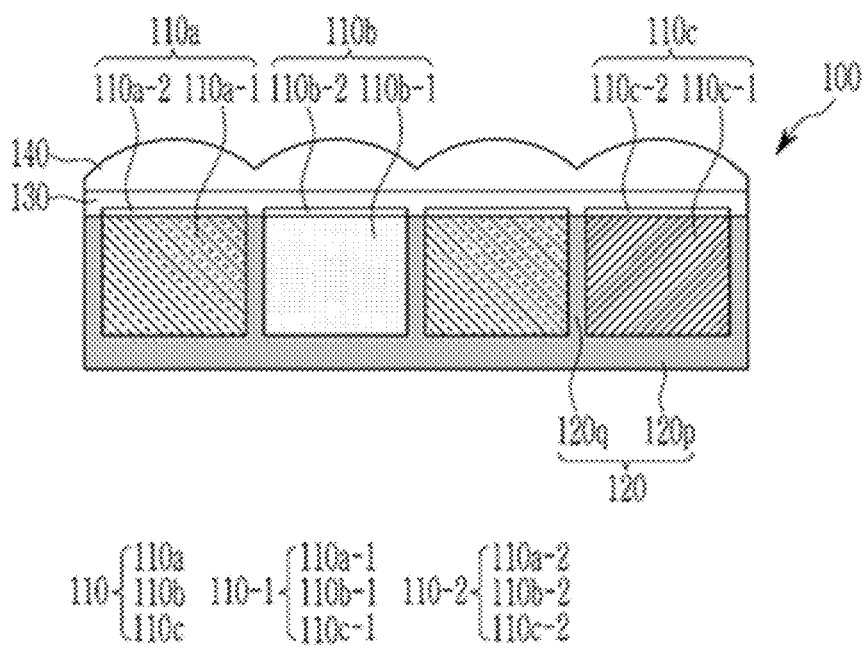

[FIG. 3]
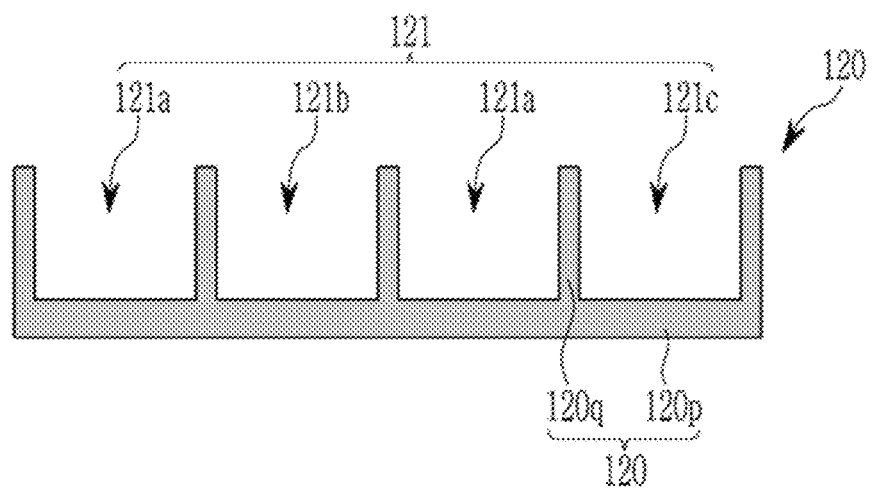
[FIG. 4]
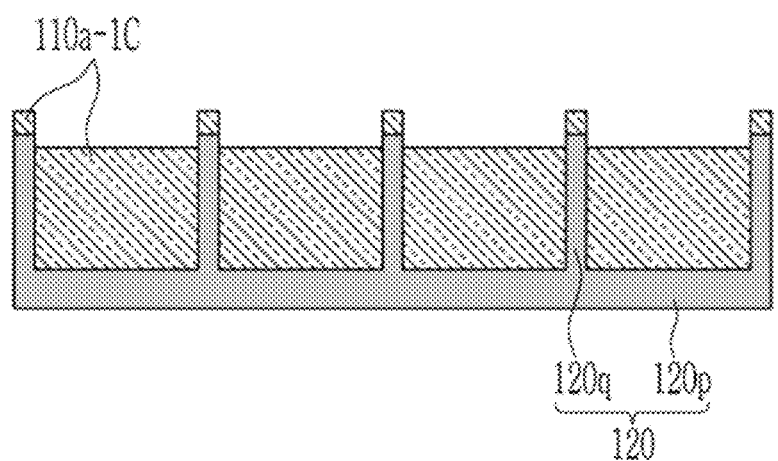

[FIG. 5]
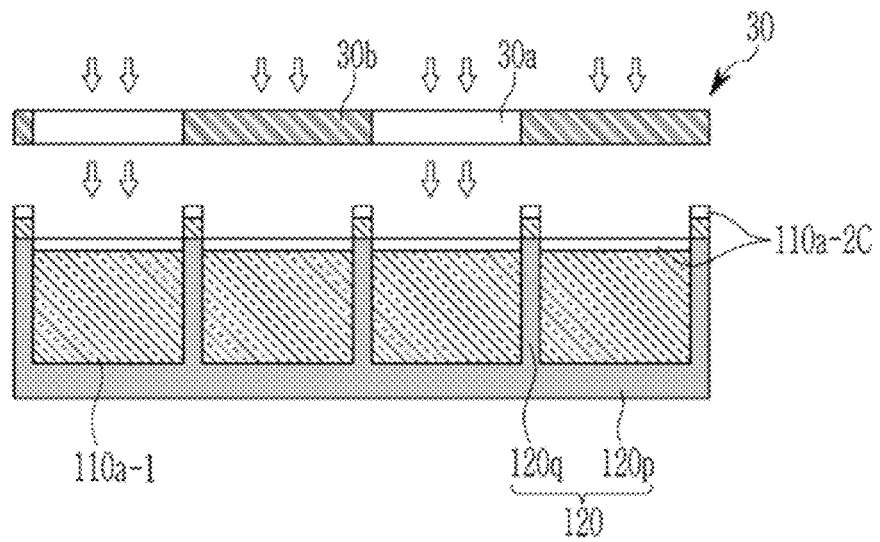
[FIG. 6]
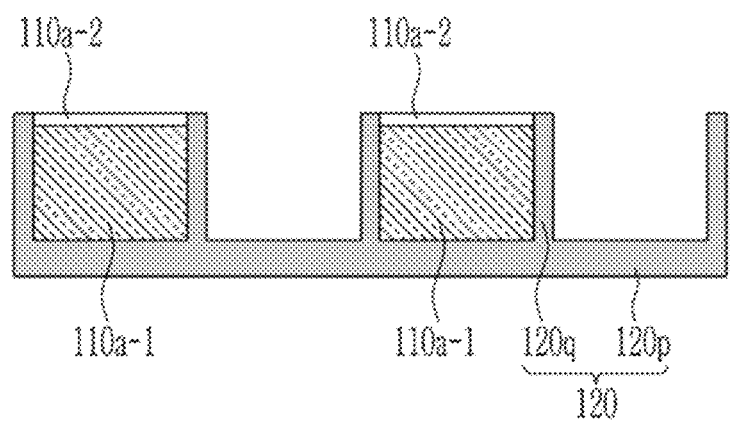

[FIG. 7]
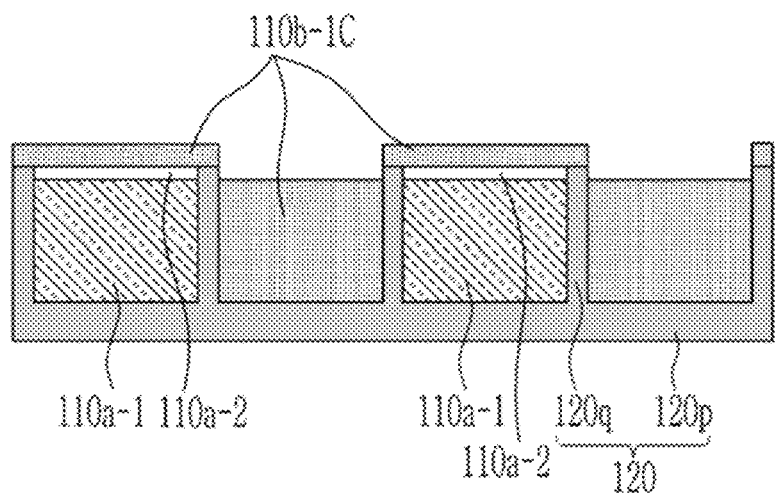
[FIG. 8]
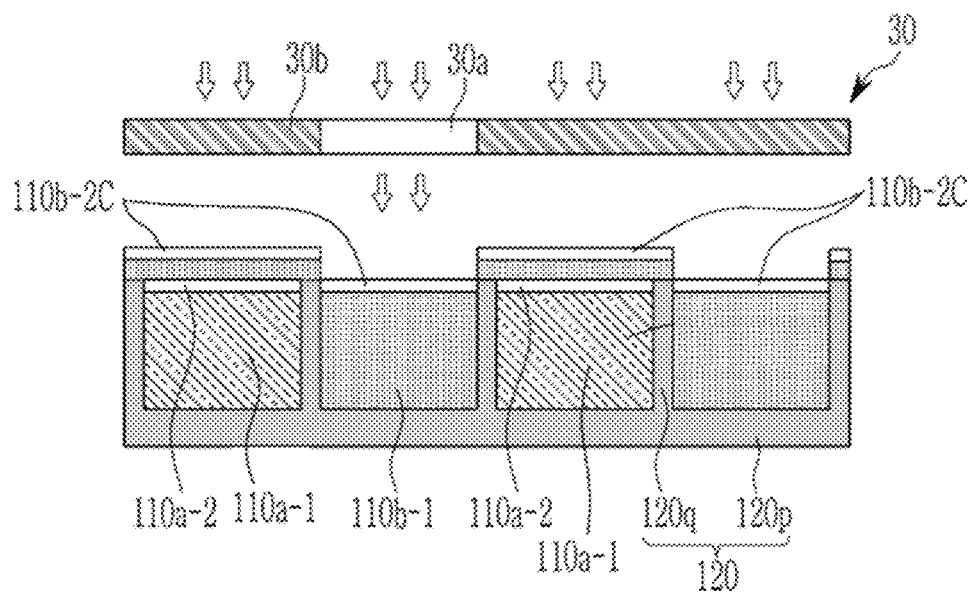

[FIG. 9]
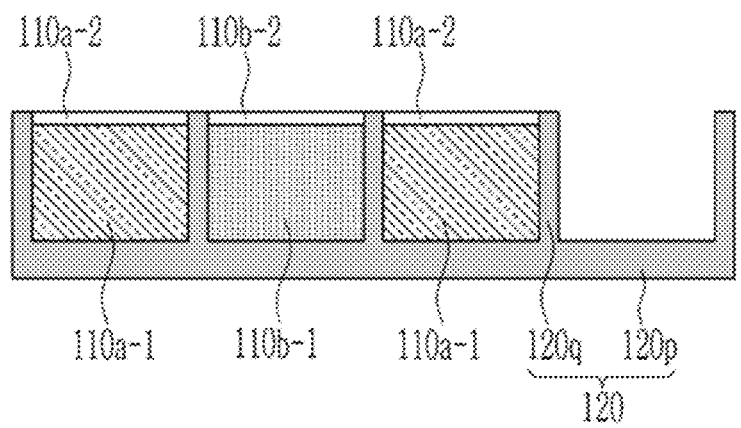
[FIG. 10]
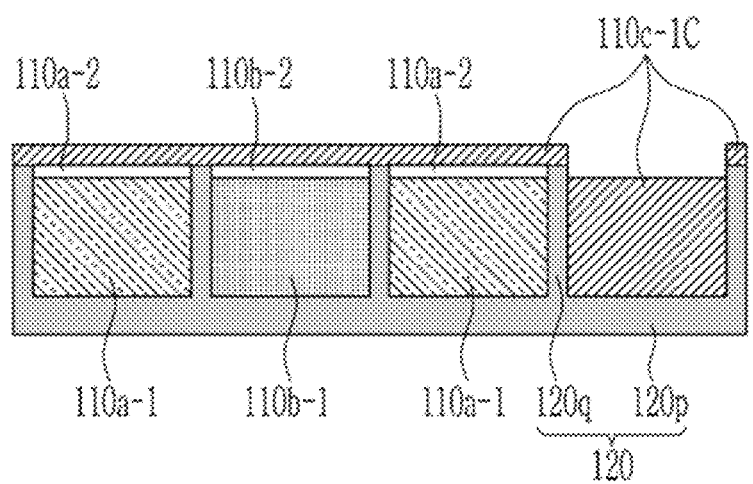

[FIG. 11]
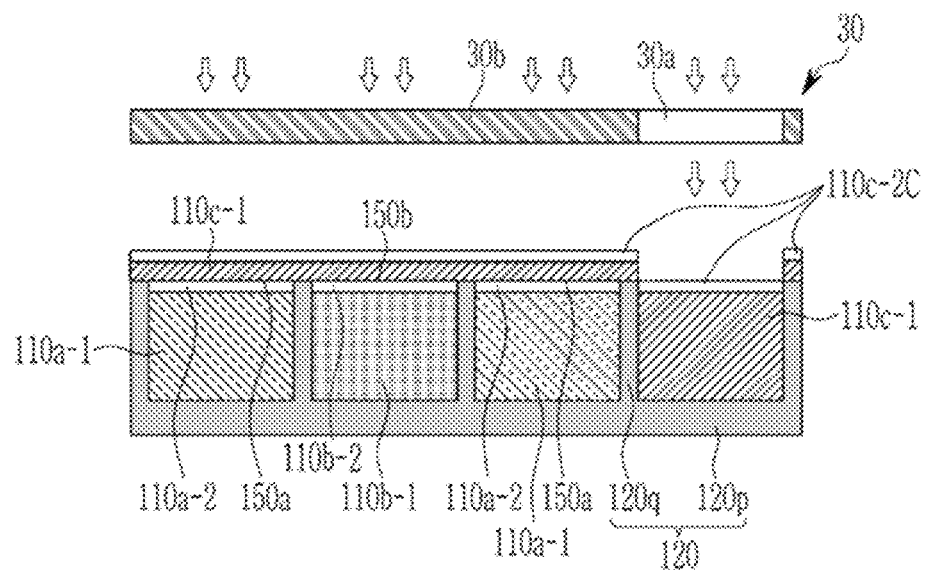
[FIG. 12]
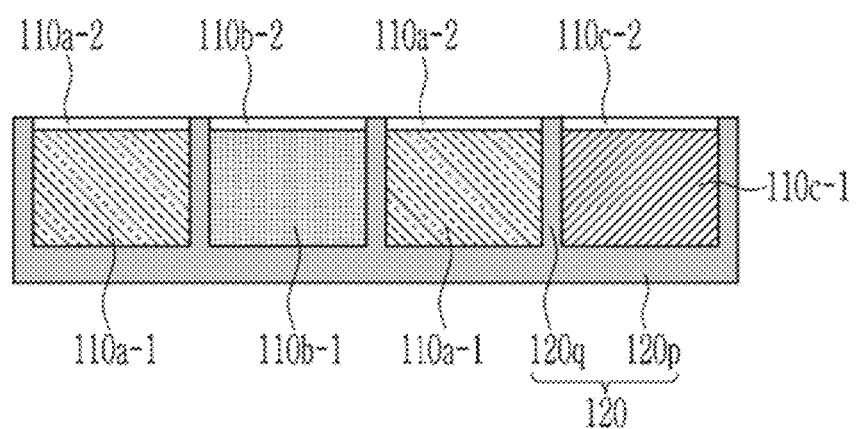

[FIG. 13]
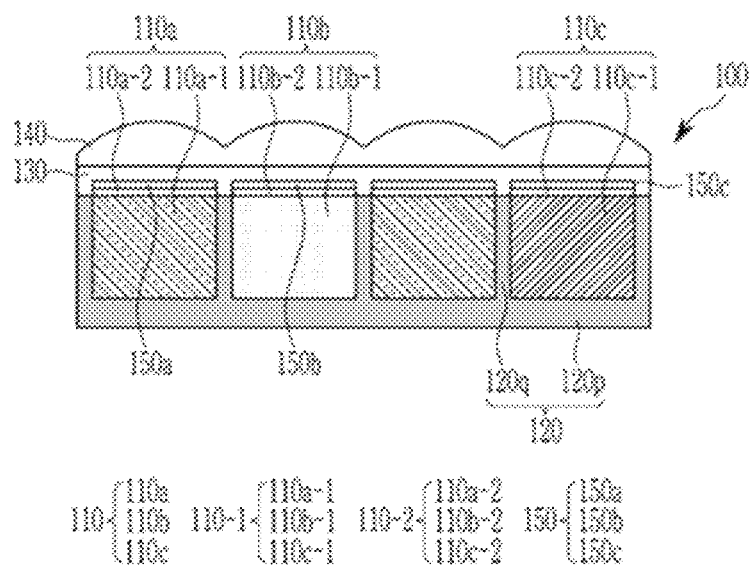
[FIG. 14]
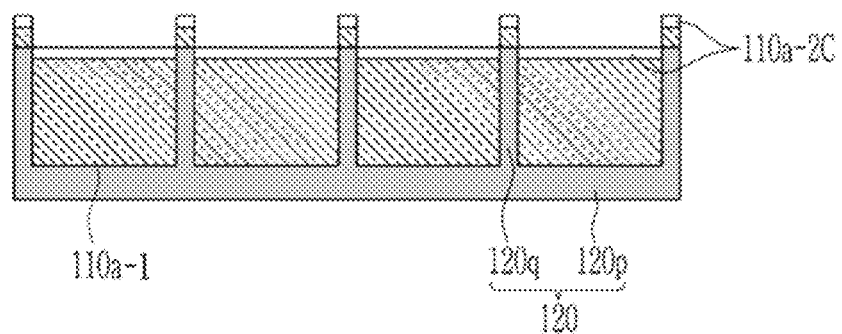

[FIG. 15]
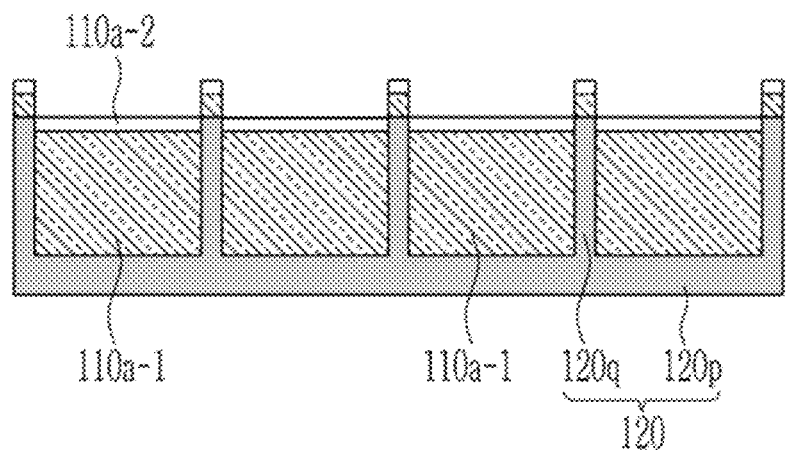
[FIG. 16]
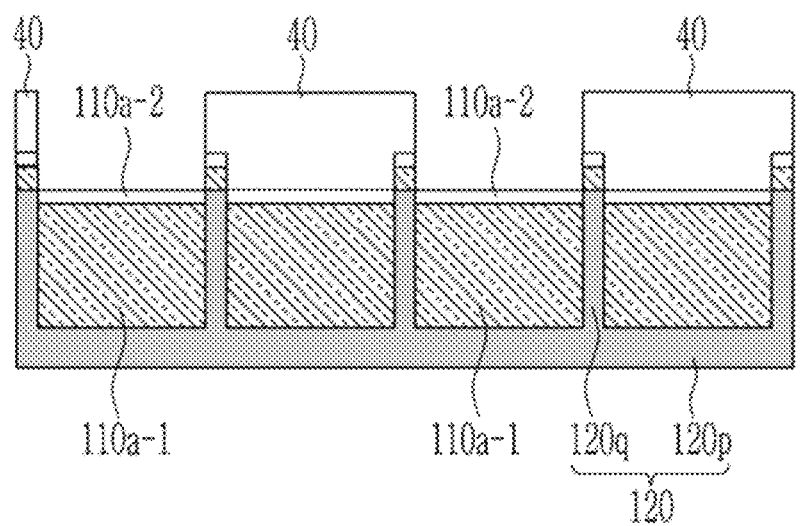

[FIG. 17]
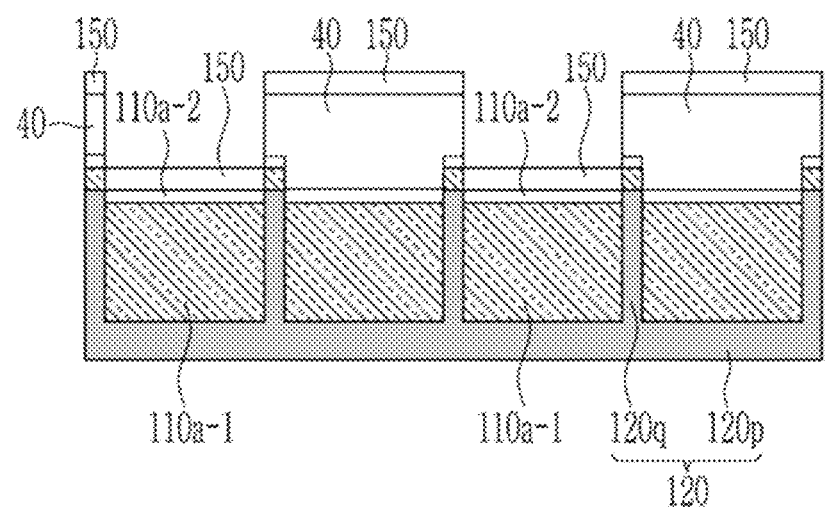
[FIG. 18]
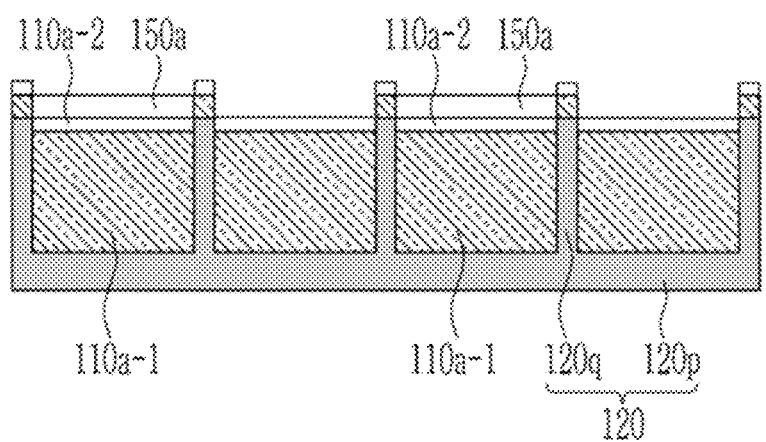

[FIG. 19]
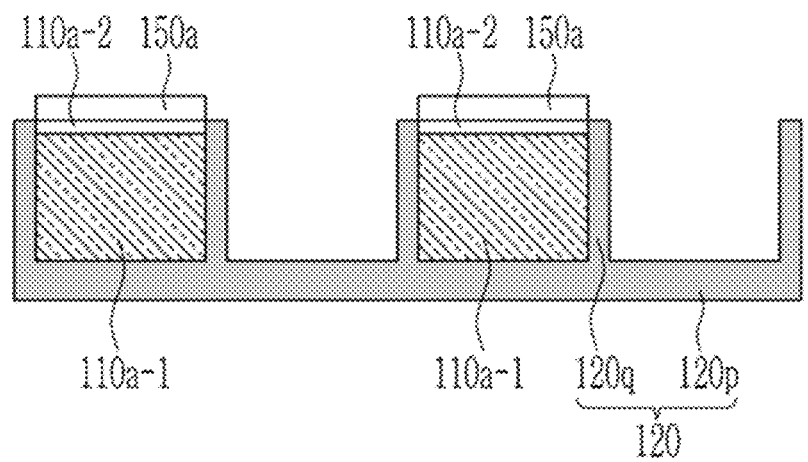
[FIG. 20]
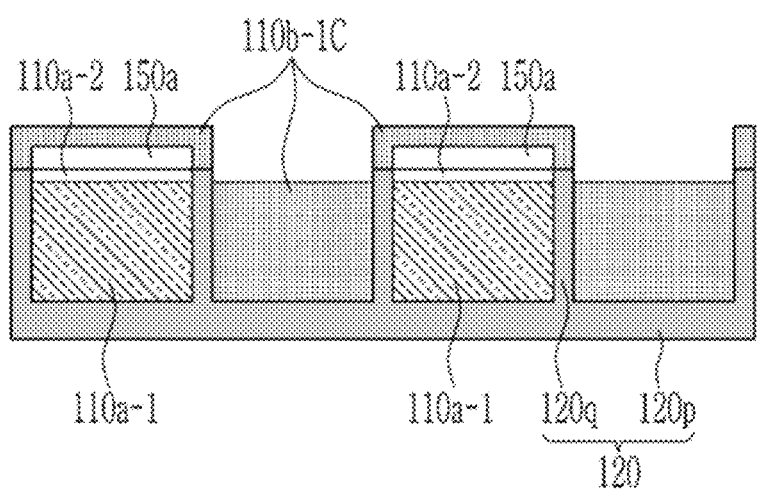

[FIG. 21]
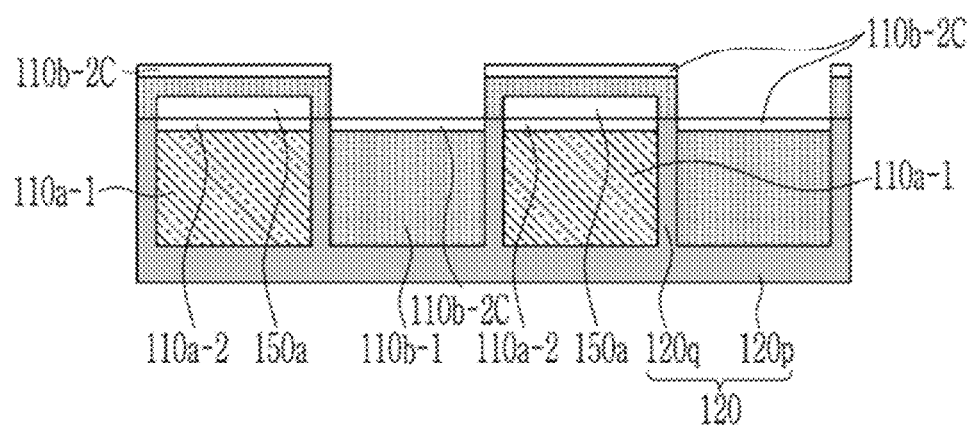
[FIG. 22]
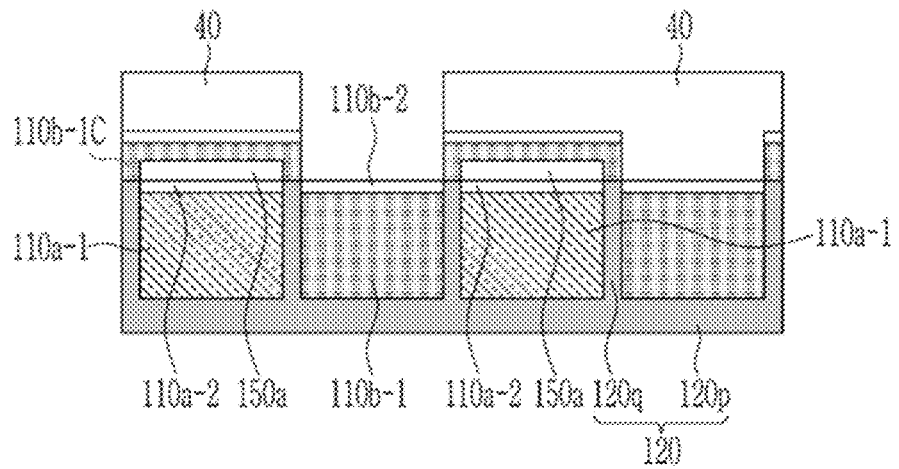

[FIG. 23]
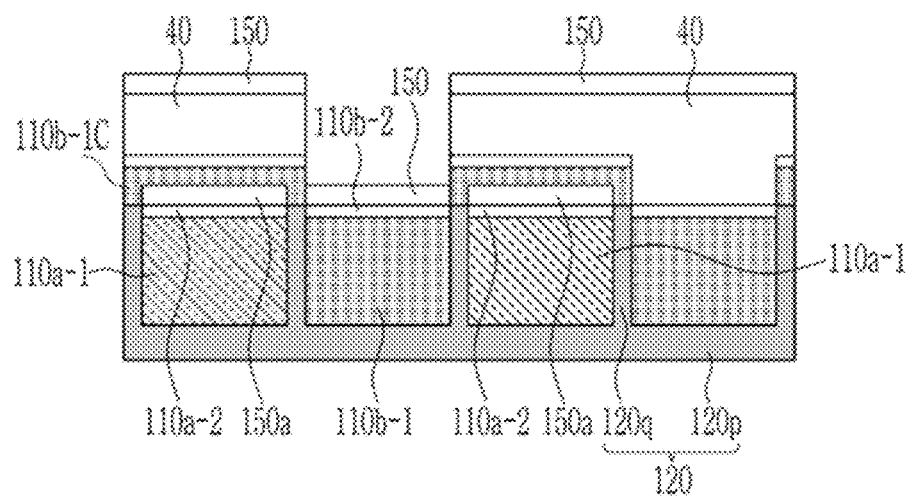
[FIG. 24]
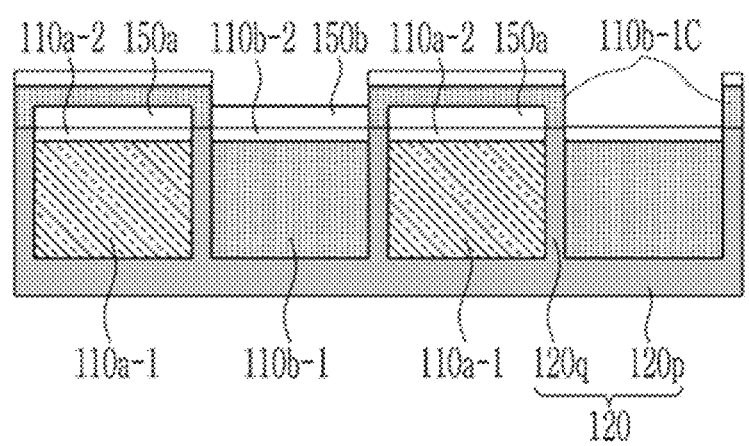

[FIG. 25]
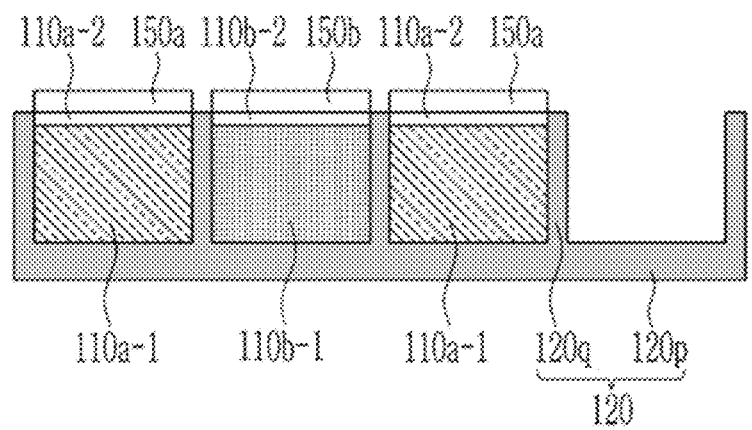
[FIG. 26]
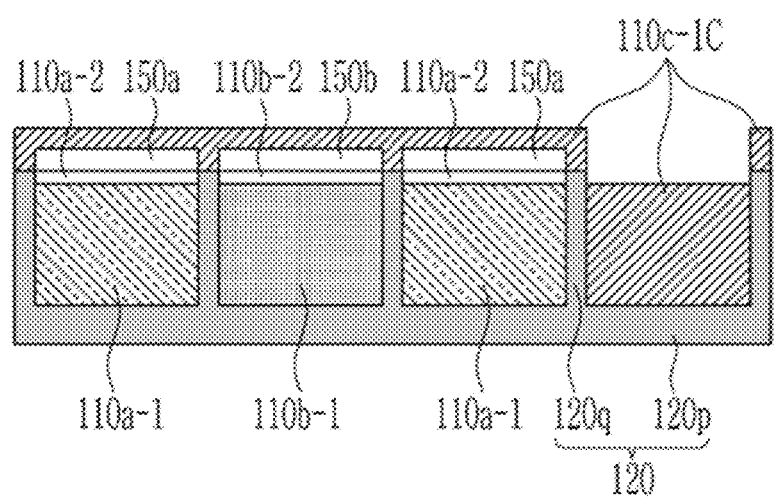

[FIG. 27]
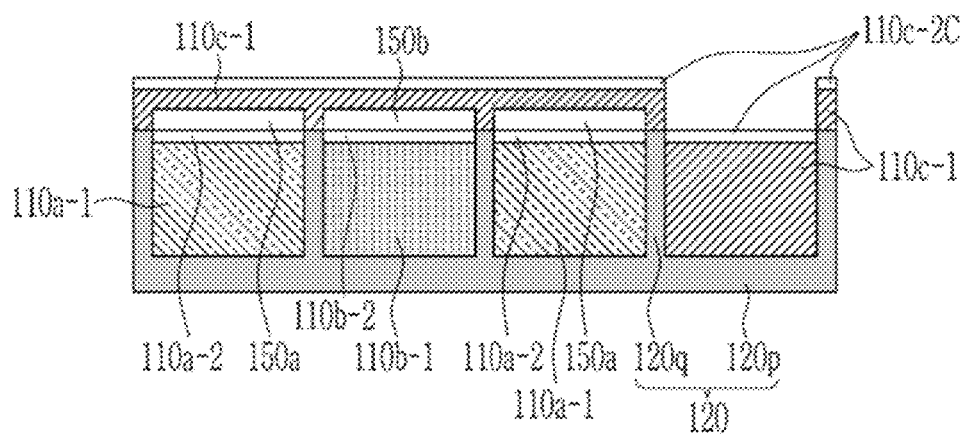
[FIG. 28]
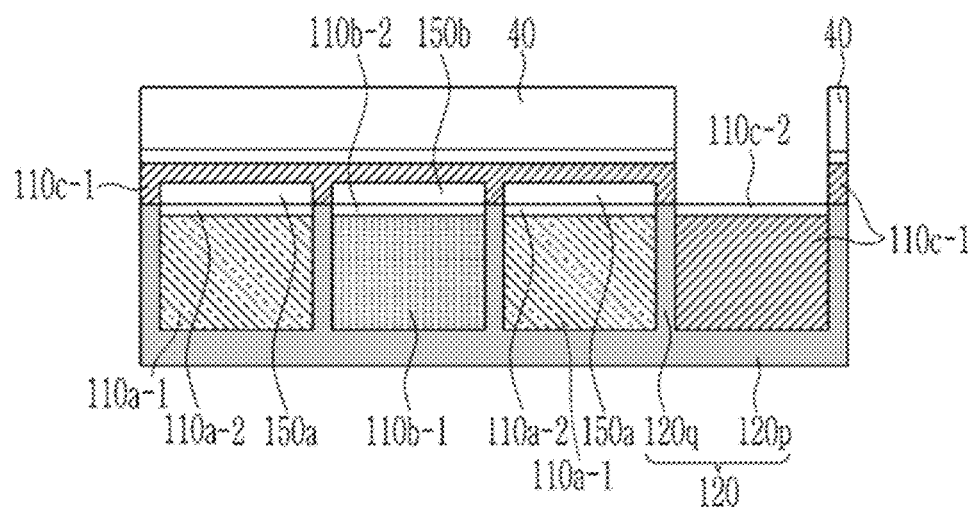

[FIG. 29]
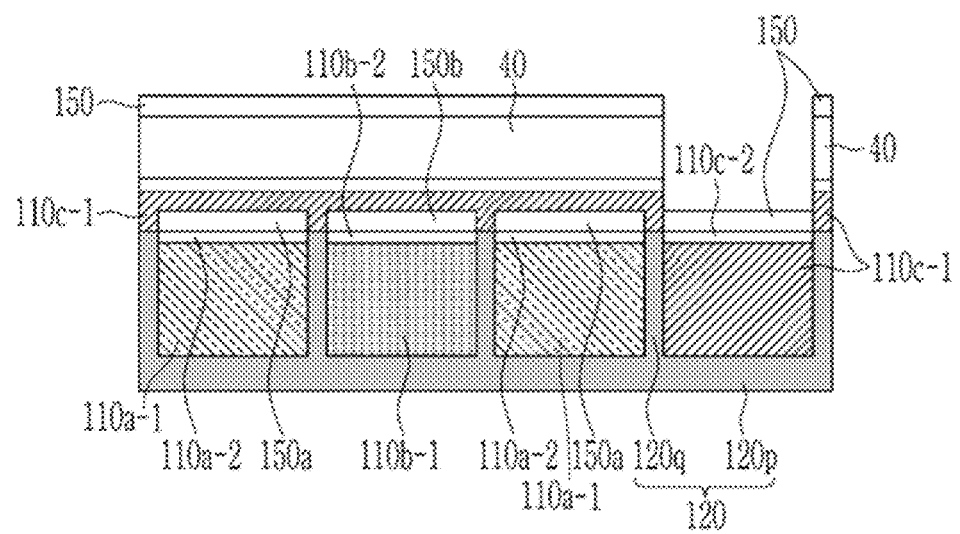
[FIG. 30]
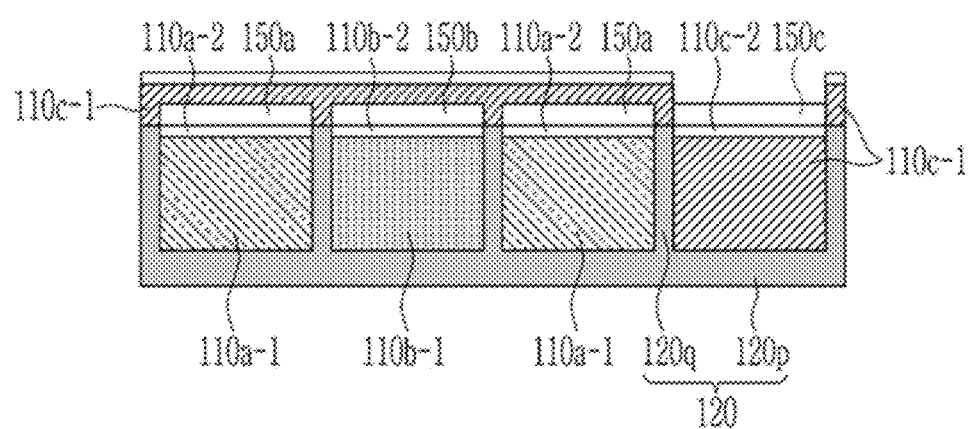

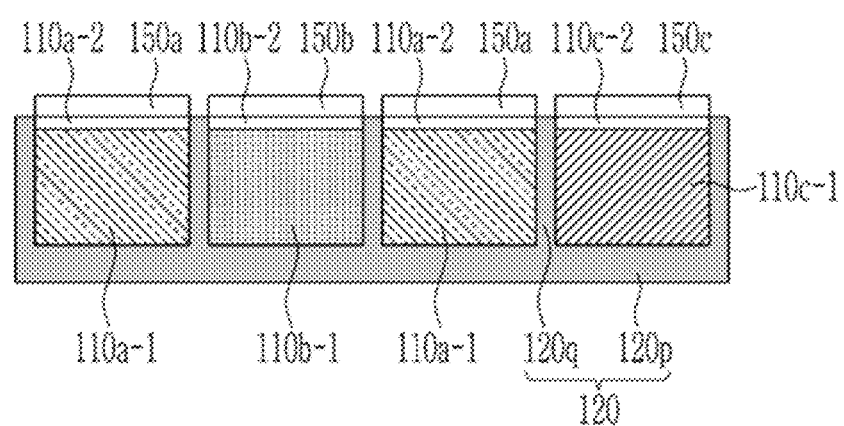
[FIG. 31]

[FIG. 32]
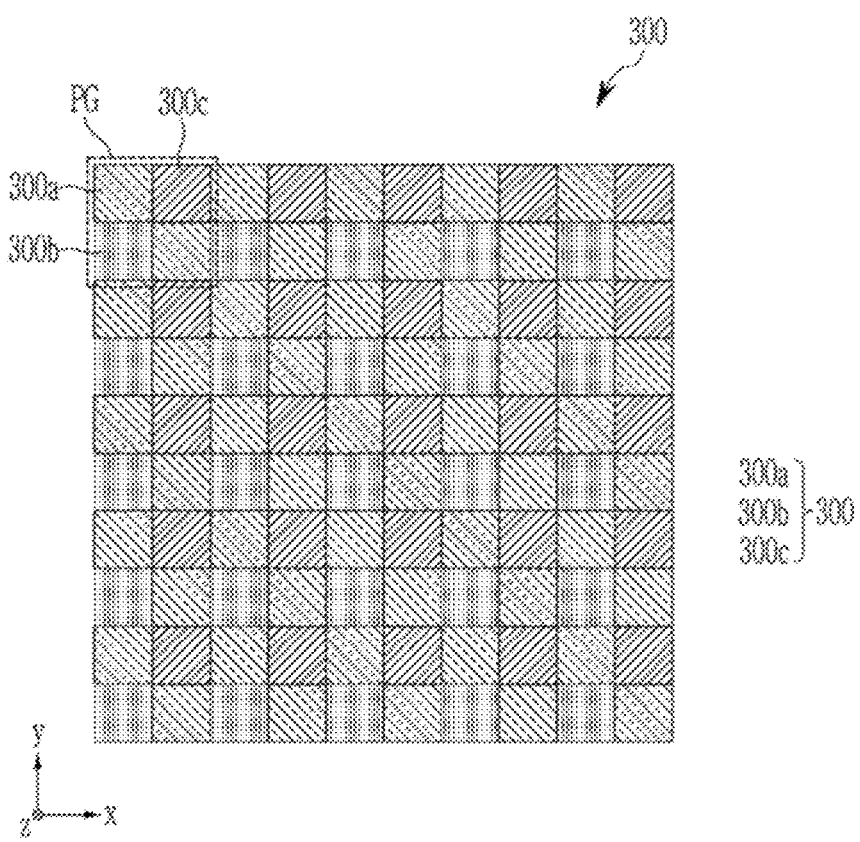

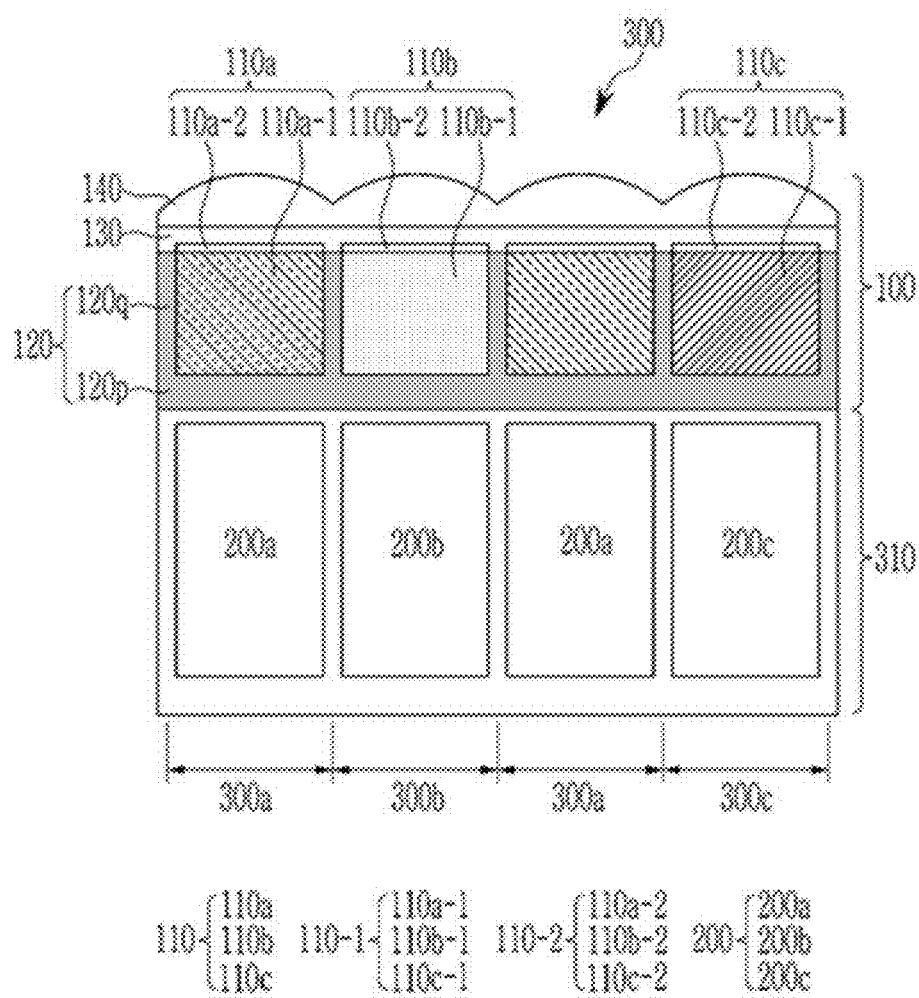

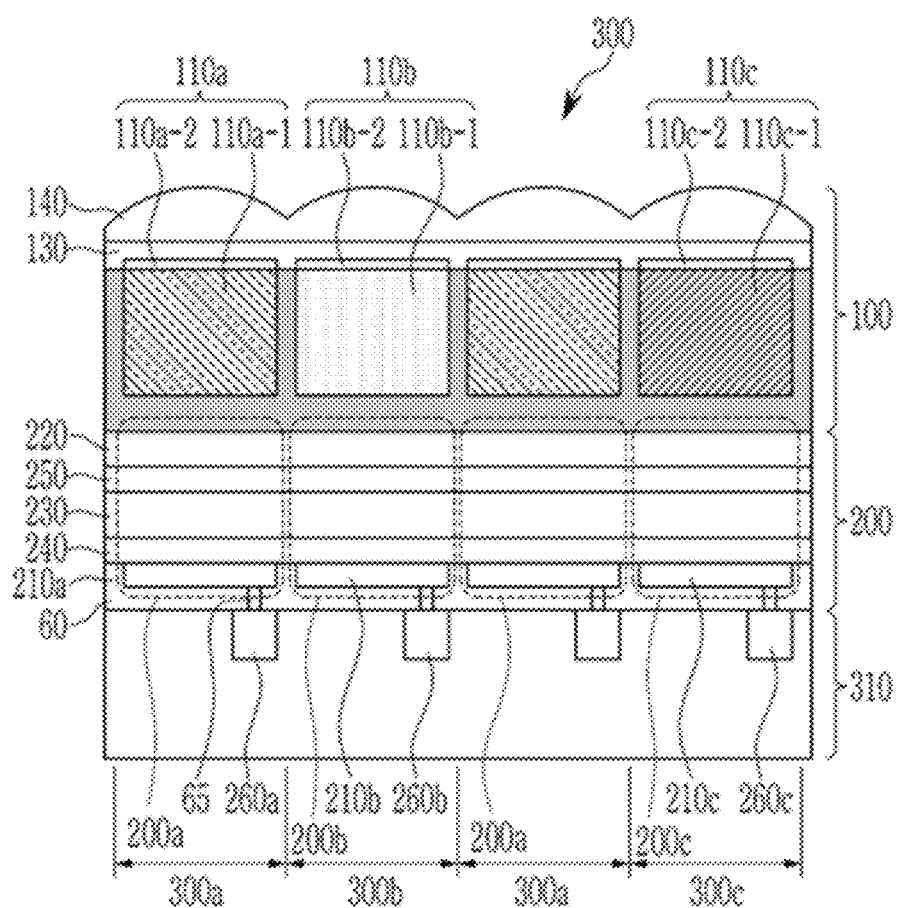
[FIG. 34]

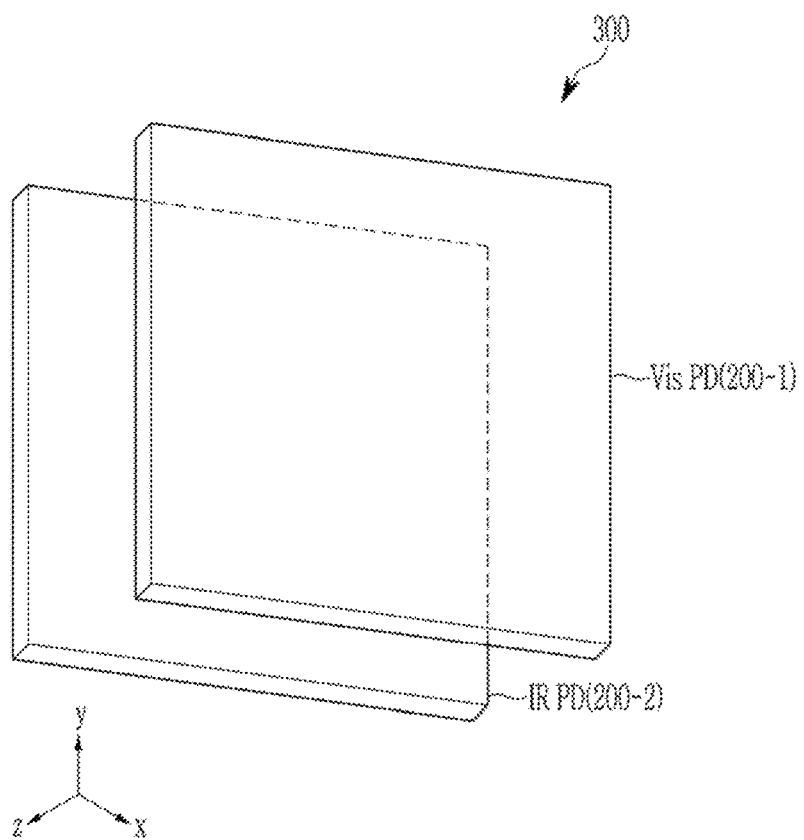
[FIG. 35]

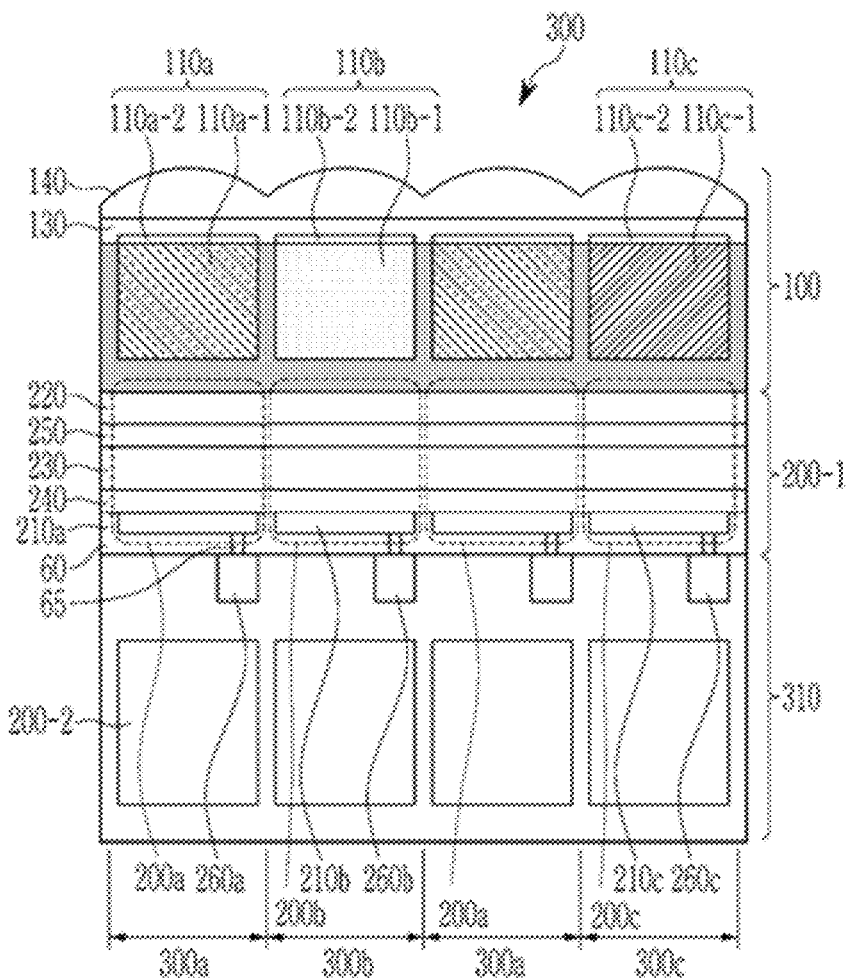

[FIG. 37]
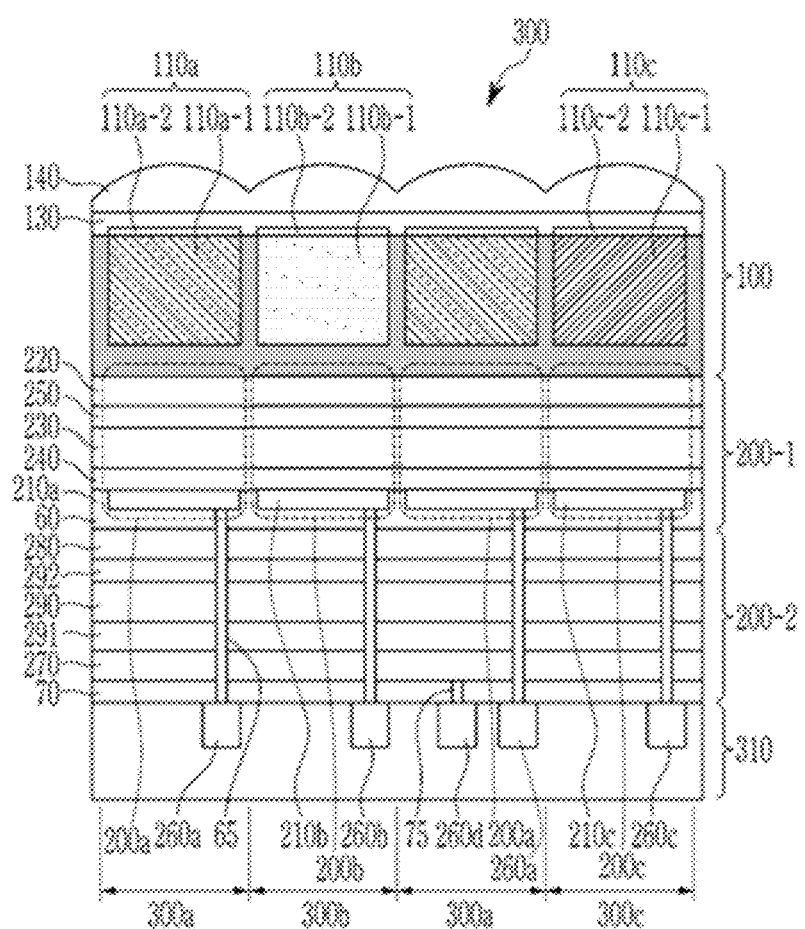

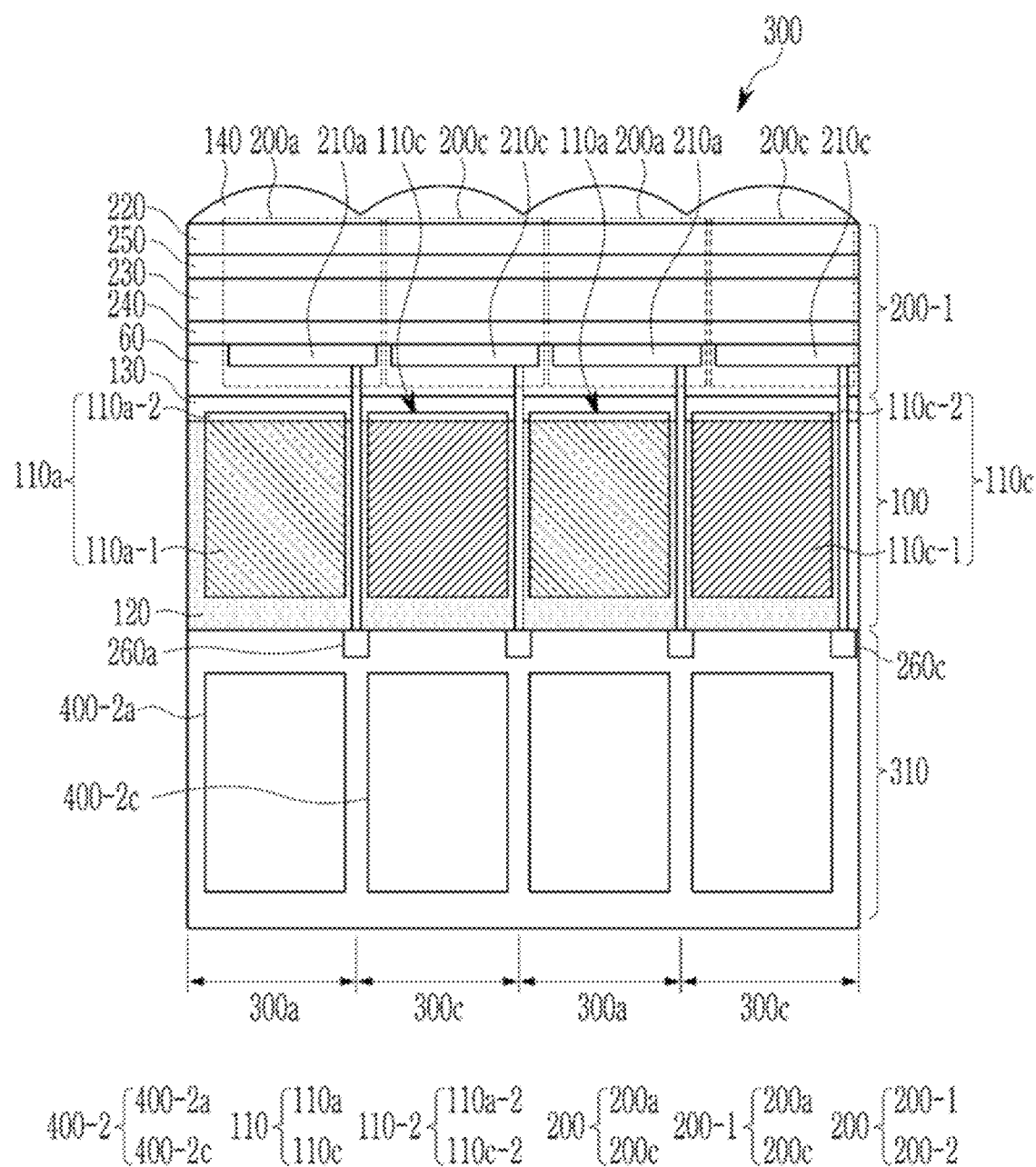

[FIG. 39]
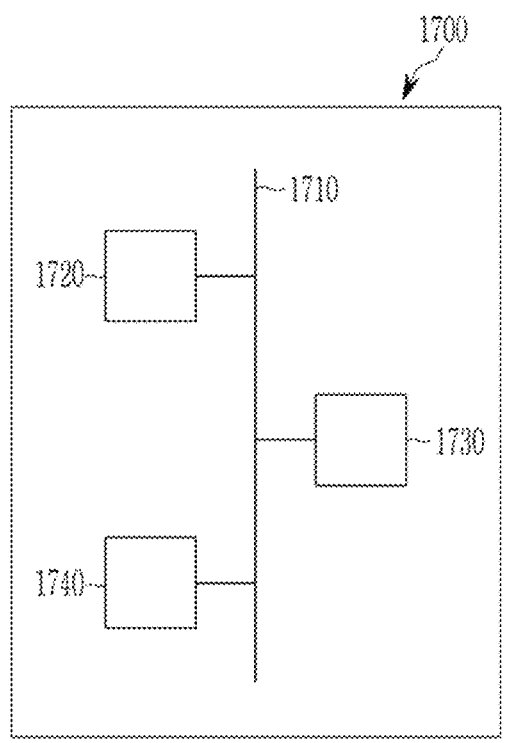

COLOR FILTER ARRAY, IMAGE SENSOR, CAMERA AND ELECTRONIC DEVICE

CROSS-REFERENCE TO RELATED APPLICATION

This application claims priority to and the benefit of Korean Patent Application No. 10-2021-0105762 filed in the Korean Intellectual Property Office on Aug. 11, 2021, the entire contents of which are incorporated herein by reference.

BACKGROUND

1. Field

Color filter arrays, image sensors, cameras, and electronic devices are disclosed.

2. Description of the Related Art

An imaging apparatus such as a camera includes an imaging device that captures an image and stores the image as an electrical signal, and the imaging device includes an image sensor that decomposes incident light according to a wavelength and converts each component into an electrical signal. The image sensor includes a color filter that imparts wavelength selectivity for each pixel.

SUMMARY

Some example embodiments provide a color filter array capable of improving performance with a thin thickness. The color filter array have a reduced size (e.g., reduced thickness) and thus may be configured to enable implementation of a high-resolution image sensor based on enabling an increased number (e.g., quantity) of pixels per unit area by reducing the pixel size due to reducing the size of the color filter.

Some example embodiments provide a method of manufacturing the color filter array to which a process suitable for forming a color filter with a small size may be applied.

Some example embodiments provide an image sensor including the color filter array.

Some example embodiments provide a camera including the color filter array or the image sensor.

Some example embodiments provide an electronic device including the color filter array, the image sensor, or the camera.

According to some example embodiments, a color filter array may include a partition wall defining a plurality of sections that are partitioned from each other by the partition wall, the plurality of sections including first, second, and third sections, and first, second, and third color filters in separate, respective sections of the first, second, and third sections, the first, second, and third color filters being configured to selectively transmit light in first, second, and third wavelength spectra, respectively, the first, second, and third wavelength spectra being different from each other and belonging to a visible light wavelength spectrum, wherein each separate color filter of the first, second, and third color filters, being in a separate section of the first section, the second section, or the third section defined by the partition wall and configured to selectively transmit light in a separate wavelength spectrum of the first, second, or third wavelength spectra, may include a colored layer in the separate section, the colored layer including a colorant defining the separate wavelength spectrum, and a transparent resin layer on the colored layer in the separate section.

A content of the colorant in the colored layer may be about 50 wt % to about 95 wt % based on a total weight of the colored layer.

The colored layer may further include a binder, a dispersant, or any combination thereof, and a total content of the colorant and the binder, the dispersant, or the any combination thereof is about 90 wt % to about 100 wt % based on the total weight of the colored layer.

The colored layer may exclude any crosslinked product of any crosslinkable monomer.

The transparent resin layer may include a crosslinked polymer and may have an average light transmittance of about 90% to about 100% in a wavelength spectrum of about 400 nm to about 700 nm.

The transparent resin layer may have a solubility in an alkali solvent of less than about 1 g/1 kg.

A refractive index of the transparent resin layer may be higher than a refractive index of the colored layer.

The refractive index of the colored layer may be higher than a refractive index of the partition wall.

A thickness of the colored layer of the separate color filter may be about 70% to about 99% of a thickness of the separate color filter.

A thickness of the colored layer may be about 300 nm to about 600 nm, and a thickness of the transparent resin layer may be less than about 200 nm.

The color filter array may further include a hardmask layer on the transparent resin layer of the separate color filter.

A refractive index of the hardmask layer may be higher than a refractive index of the transparent resin layer, and a refractive index of the transparent resin layer may be higher than a refractive index of the colored layer.

According to some example embodiments, an image sensor includes a substrate, the color filter array on the substrate, and a photo-sensing device overlapped with the color filter array.

The photo-sensing device may include a photodiode integrated in the substrate.

The photo-sensing device may include a photoelectric conversion device above or beneath the color filter array, wherein the photoelectric conversion device includes a first electrode and a second electrode facing each other, and a photoelectric conversion layer between the first electrode and the second electrode and including an organic light absorbing material, an inorganic light absorbing material, an organic-inorganic light absorbing material, perovskite, or any combination thereof.

The photo-sensing device may include a first photo-sensing device and a second photo-sensing device stacked along a thickness direction of the substrate, wherein the first photo-sensing device may be configured to sense light in the visible light wavelength spectrum, the second photo-sensing device may be configured to sense light in an infrared light wavelength spectrum, and at least one of the first photo-sensing device or the second photo-sensing device may include a perovskite structure material.

According to some example embodiments, a camera including the image sensor is provided.

According to some example embodiments, an electronic device including the color filter array, the image sensor, or the camera is provided.

According to some example embodiments, a method of manufacturing a color filter array may include forming a partition wall defining a plurality of sections that are partitioned from each other by the partition wall, the plurality of sections comprising first, second, and third sections, and sequentially forming first, second, and third color filters in separate, respective sections of the first, second, and third sections, the first, second, and third color filters being configured to selectively transmit light of first, second, and third wavelength spectra, respectively, the first, second, and third wavelength spectra being different from each other and belonging to a visible light wavelength spectrum, wherein the forming of the first color filter includes forming a first colored layer including a first colorant defining the first wavelength spectrum in the first section, and forming a first transparent resin layer on the first colored layer in the first section.

The forming of the first colored layer may include applying a first coloring composition including the first colorant and a binder, a dispersant, or any combination thereof, and annealing the first coloring composition, wherein a content of the first colorant is about 50 wt % to about 95 wt % based on a solid content of the first coloring composition.

The first coloring composition may not include any crosslinkable monomer.

The forming of the first transparent resin layer may include applying a transparent composition on the first colored layer in the first section, the transparent composition comprising a reaction initiator and a crosslinkable monomer, and curing the transparent composition.

The curing of the transparent composition may further include selectively exposing the transparent composition in the first section by negative photolithography to define at least one exposed portion of the transparent composition and at least one unexposed portion of the transparent composition, and removing the at least one unexposed portion of the transparent composition and a portion of the first colored composition that is outside the first section to selectively form the first colored layer and the first transparent resin layer in the first section.

The curing of the transparent composition may be performed by thermal curing, photo-curing, or any combination thereof; the manufacturing method may further include forming a first hardmask layer on the first transparent resin layer and dry-etching the first hardmask layer subsequent to the forming of the first transparent resin layer; the forming of the first hardmask layer may include applying and patterning a positive photoresist film on the partition wall and the first, second, and third sections to expose the first transparent resin layer in the first section, applying a hardmask layer on the positive photoresist film and the first transparent resin layer, and removing the positive photoresist film and the hardmask layer to selectively form the first hardmask layer on the first transparent resin layer; and the dry-etching may include dry-etching using the first hardmask layer as a mask to remove respective portions of the first colored layer and the first transparent resin layer that are outside the first section and to selectively form the first colored layer, the first transparent resin layer, and the first hardmask layer in the first section.

The forming of the second color filter may include forming a second colored layer including a second colorant defining the second wavelength spectrum in the second section, and forming a second transparent resin layer on the second colored layer in the second section; the forming of the second colored layer may include applying a second coloring composition including the second colorant and a binder, a dispersant, or any combination thereof, and annealing the second coloring composition wherein a content of the second colorant is about 50 wt % to about 95 wt % based on a solid content of the second coloring composition; and the forming of the second transparent resin layer may include applying a transparent composition on the second colored layer in the second section, the transparent composition comprising a reaction initiator and a crosslinkable monomer, and curing the transparent composition.

The curing of the transparent composition may include selectively exposing the transparent composition in the second section by negative photolithography to define at least one exposed portion of the transparent composition and at least one unexposed portion of the transparent composition, and removing the at least one unexposed transparent composition and the second coloring composition outside the second section to selectively form the second colored layer and the second transparent resin layer in the second section.

The curing of the transparent composition may be performed by thermal curing, photo-curing, or any combination thereof; the method may further include forming a second hardmask layer on the second transparent resin layer, and dry-etching the second hardmask layer, subsequent to the forming of the second transparent resin layer; the forming of the second hardmask layer may include applying and patterning a positive photoresist film on the partition wall and in the first, second, and third sections to expose the second transparent resin layer in the second section, applying a hardmask layer on the positive photoresist film and the second transparent resin layer, and removing the positive photoresist film and the hardmask layer on the positive photoresist film to selectively form the second hardmask layer on the second transparent resin layer; and the dry-etching may include dry-etching using the second hardmask layer as a mask to remove respective portions of the second coloring composition and the second transparent resin layer that are outside the second section and selectively form the second colored layer, the second transparent resin layer, and the second hardmask layer in the second section.

The forming of the third color filter may include forming a third colored layer including a third colorant defining the third wavelength spectrum in the third section, and forming a third transparent resin layer on the third colored layer of the third section, wherein the forming of the third colored layer may include applying a third coloring composition in the third section, the third coloring composition comprising the third colorant and a binder, a dispersant, or any combination thereof, and annealing the third coloring composition, wherein a content of the third colorant may be about 50 wt % to about 95 wt % based on a solid content of the third coloring composition, and the forming of the third transparent resin layer may include applying the transparent composition comprising the reaction initiator and the crosslinkable monomer on the third colored layer in the third section, and curing the transparent composition.

The curing of the transparent composition may include selectively exposing the transparent composition in the third section by negative photolithography to define at least one exposed portion of the transparent composition and at least one unexposed portion of the transparent composition, and removing the at least one unexposed portion of the transparent composition and the third colored composition that are outside the third section to selectively form the third colored layer and the third transparent resin layer in the third section.

The curing of the transparent composition may be performed by thermal curing, photo-curing, or any combination thereof; the manufacturing method may further include forming a third hardmask layer on the third transparent resin layer subsequent to forming of the third transparent resin layer, and dry-etching the third hardmask layer; the forming of the third hardmask layer may include applying and patterning a positive photoresist film on the partition wall and in the first, second, and third sections to expose the third transparent resin layer in the third section, applying a hardmask layer on the positive photoresist film and the third transparent resin layer, and removing the positive photoresist film and the hardmask layer on the positive photoresist film to selectively form the third hardmask layer on the third transparent resin layer; and the dry-etching may include dry-etching using the third hardmask layer as a mask to remove respective portions of the third coloring composition and the third transparent resin layer that are outside the third section and selectively form the third colored layer, the third transparent resin layer, and the third hardmask layer in the third section.

According to some example embodiments, a color filter array may include a partition wall defining a section; and a color filter in the section, the color filter configured to selectively transmit light in a wavelength spectrum belonging to a limited portion of a visible light wavelength spectrum. The color filter may include a colored layer in the section, the colored layer including a colorant defining the wavelength spectrum, and a transparent resin layer on the colored layer in the section.

The partition wall may define a plurality of sections that are partitioned from each other by the partition wall. The color filter array may include a plurality of color filters in separate, respective sections of the plurality of sections, the plurality of color filters including the color filter, the plurality of color filters being configured to selectively transmit light in at least a first wavelength spectrum, the first wavelength spectrum belonging to the visible light wavelength spectrum.

Each separate color filter of the plurality of color filters, being in a separate section of the plurality of sections, may include a separate colored layer in the separate section, the separate colored layer including a colorant defining the first wavelength spectrum, and a separate transparent resin layer on the colored layer in the separate section.

The partition wall may define a plurality of sections that are partitioned from each other by the partition wall. the color filter array may include a plurality of color filters in separate, respective sections of the plurality of sections, the plurality of color filters including the color filter, the plurality of color filters being configured to selectively transmit light in one of a plurality of wavelength spectra, the plurality of wavelength spectra being different from each other and belonging to the visible light wavelength spectrum. Each separate color filter of the plurality of color filters, being in a separate section of the plurality of sections and configured to selectively transmit a separate wavelength spectrum of the plurality of wavelength spectra, may include a separate colored layer in the separate section, the separate colored layer including a colorant defining the separate wavelength spectrum, and a separate transparent resin layer on the colored layer in the separate section.

According to some example embodiments, an image sensor may include a substrate, the color filter array on the substrate; and a photo-sensing device overlapped with the color filter array. The photo-sensing device may include a first photo-sensing device and a second photo-sensing device stacked along a thickness direction of the substrate. The first photo-sensing device may include a photoelectric conversion device above the color filter array, such that the color filter array is between the photoelectric conversion device and the substrate. The photoelectric conversion device may include a first electrode and a second electrode facing each other, and a photoelectric conversion layer between the first electrode and the second electrode, the photoelectric conversion layer comprising an organic light absorbing material, an inorganic light absorbing material, an organic-inorganic light absorbing material, perovskite, or any combination thereof. The second photo-sensing device may include a plurality of photodiodes integrated in the substrate, each photodiode of the plurality of photodiodes vertically overlapped with a separate color filter of the plurality of color filters, the plurality of photodiodes each configured to absorb and photoelectrically convert light in at least a portion of the visible light wavelength spectrum.

The photoelectric conversion layer may be configured to selectively absorb and photoelectrically convert light in one wavelength spectrum belonging to the visible light wavelength spectrum. The plurality of color filters may be each configured to selectively transmit light in one of the plurality of wavelength spectra, the plurality of wavelength spectra being different from each other, belonging to the visible light wavelength spectrum, and excluding the one wavelength spectrum, such that the photodiodes integrated in the substrate and vertically overlapping separate, respective color filters of the plurality of color filters are configured to absorb and photoelectrically convert light of one of the plurality of wavelength spectra that is different from the one wavelength spectrum.

Performance with a thin thickness may be improved, and a process suitable for forming a color filter with a small size may be effectively applied.

BRIEF DESCRIPTION OF THE DRAWINGS

FIG. 1 is a plan view showing an example of a color filter array according to some example embodiments, FIG. 2 is a cross-sectional view showing an example of a unit group of the color filter array of FIG. 1, FIGS. 3, 4, 5, 6, 7, 8, 9, 10, 11, and 12 are cross-sectional views sequentially showing examples of a method of manufacturing the color filter array shown in FIGS. 1 and 2, FIG. 13 is a cross-sectional view showing another example of the unit group of the color filter array of FIG. 1, FIGS. 14, 15, 16, 17, 18, 19, 20, 21, 22, 23, 24, 25, 26, 27, 28, 29, 30, and 31 are cross-sectional views sequentially illustrating an example of a method of manufacturing the color filter array shown in FIG. 13, FIG. 32 is a perspective view showing an example of an image sensor according to some example embodiments, FIG. 33 is a cross-sectional view showing an example of a unit pixel group of the image sensor of FIG. 32, FIG. 34 is a cross-sectional view showing another example of a unit pixel group of the image sensor of FIG. 32, FIG. 35 is a perspective view showing another example of an image sensor according to some example embodiments, FIG. 36 is a cross-sectional view showing an example of a unit pixel group of the image sensor of FIG. 35, FIG. 37 is a cross-sectional view showing another example of a unit pixel group of the image sensor of FIG. 35, FIG. 38 is a cross-sectional view showing an example of a unit pixel group of the image sensor of FIG. 35, and FIG. 39 is a schematic view of an electronic device according to some example embodiments.

DETAILED DESCRIPTION

Hereinafter, example embodiments of the present inventive concepts will be described in detail so that a person skilled in the art would understand the same. However, the inventive concepts may be embodied in many different forms and is not to be construed as limited to the example embodiments set forth herein.

In the drawings, the thickness of layers, films, panels, regions, etc., are exaggerated for clarity. It will be understood that when an element such as a layer, film, region, or substrate is referred to as being "on" another element, it may be directly on the other element or intervening elements may also be present. In contrast, when an element is referred to as being "directly on" another element, there are no intervening elements present. It will further be understood that when an element is referred to as being "on" another element, it may be above or beneath or adjacent (e.g., horizontally adjacent) to the other element.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being the "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

While the term "same," "equal" or "identical" may be used in description of some example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

In the drawings, parts having no relationship with the description are omitted for clarity, and the same or similar constituent elements are indicated by the same reference numeral throughout the specification.

Hereinafter, the terms "lower portion" and "upper portion" are for convenience of description and do not limit the positional relationship.

Hereinafter, the upper portion of the image sensor is described as a light-receiving side, but this is for better understanding and ease of description and does not limit the positional relationship.

Hereinafter, the term "combination" includes a mixture and a stacked structure of two or more.

Hereinafter, an example of a color filter array according to some example embodiments is described.

FIG. 1 is a plan view showing an example of a color filter array according to some example embodiments, and FIG. 2 is a cross-sectional view showing an example of a unit group of the color filter array of FIG. 1.

Referring to FIG. 1, the color filter array 100 according to some example embodiments includes a plurality of color filters 110 configured to selectively transmit light of a particular (or, alternatively, predetermined) wavelength spectrum belonging to a visible light wavelength spectrum, and the plurality of color filters 110 are repeatedly arranged, for example, along a row and/or column direction.

The plurality of color filters 110 may include first, second, and third color filters 110a, 110b, and 110c configured to selectively transmit light of first, second, and third wavelength spectra belonging to a visible light wavelength spectrum. The first, second, and third color filters 110a, 110b, and 110c may be configured to selectively transmit different (e.g., separate, respective) light of the first, second, and third wavelength spectra. The first, second, and third wavelength spectra may be different from each other and may be selected from, for example, a green wavelength spectrum, a red wavelength spectrum, a blue wavelength spectrum, or any combination thereof. The green wavelength spectrum may be, for example, from about 500 nm to about 600 nm, the red wavelength spectrum may be greater than about 600 nm and less than about 750 nm, and the blue wavelength spectrum may be greater than or equal to about 380 nm and less than about 500 nm. Herein, the selectively transmitting of light of the first, second, and third wavelength spectra may mean that a peak wavelength of the transmission spectrum exists in the corresponding wavelength spectrum, the transmission spectrum within the corresponding wavelength spectrum is significantly higher than the transmission spectrum of the other wavelength spectrum, and a transmission spectrum within that wavelength spectrum is from about 70% to about 100%, about 75% to about 100%, about 80% to about 100%, about 85% to about 100%, about 90% to about 100%, or about 95% to about 100% of the total transmission spectrum.

The first, second, and third color filters 110a, 110b, and 110c may be selected from a green filter configured to selectively transmit light of a green wavelength spectrum, a red filter configured to selectively transmit light of a red wavelength spectrum, a blue filter configured to selectively transmit light of a blue wavelength spectrum, a cyan filter configured to selectively transmit light of a blue to green wavelength spectrum, a yellow filter configured to selectively transmit light of a green to red wavelength spectrum, and a magenta filter configured to selectively transmit light of a blue wavelength spectrum and red wavelength spectrum. For example, the first, second, and third color filters 110a, 110b, and 110c may be a green filter, a red filter, and a blue filter, respectively. For example, the first, second, and third color filters 110a, 110b, and 110c may be a cyan filter, a yellow filter, and a magenta filter, respectively.

At least one first color filter 110a, at least one second color filter 110b, and at least one third color filter 110c may form one unit group UG and may be arranged repeatedly along a row and/or a column. For example, each unit group UG may include two first color filters 110a (e.g., green filters), one second color filter 110b (e.g., red filter), and one third color filter 110c (e.g., blue filter), but is not limited thereto.

The first, second, and third color filters 110a, 110b, and 110c are disposed in each section partitioned by (e.g., defined by) the partition wall 120. Each "section" may be understood to be a volume space, which may be an at least partially open enclosure, having boundaries that are partially or entirely defined by the partition wall 120.

Referring to FIGS. 2 and 3, the color filter array 100 includes a partition wall 120 that defines separate, respective section 121 that are partitioned from each other by the partition wall 120, and a color filter 110 in a section 121 partitioned by the partition wall 120.

The partition wall 120 may include a lower surface 120p at the whole surface of the color filter array 100 and a sidewall 120q extending substantially perpendicular to the lower surface 120p. The sidewall 120q of the partition wall 120 may be formed in, for example, a grid pattern to partition a plurality of sections 121 in which the color filters 110 are disposed from each other. The plurality of sections 121 may include a first section 121a in which the first color filter 110a is disposed, a second section 121b in which the second color filter 110b is disposed, and a third section 121c in which the third color filter 110c is disposed, and each sidewall 120q may be disposed between the first color filter 110a and the second color filter 110b, between the second color filter 110b and the third color filter 110c, and between the third color filter 110c and the first color filter 110a, respectively.

The partition wall 120 may include an inorganic material having a relatively low refractive index, an organic material having a relatively low refractive index, an organic-inorganic material having a relatively low refractive index, or any combination thereof, and may include, for example, an oxide, a nitride, or an oxynitride, for example, silicon oxide, silicon nitride, silicon oxynitride, or any combination thereof, but is not limited thereto.

The first, second, and third color filters 110a, 110b, and 110c may be respectively disposed in separate, respective sections of the first, second, and third sections 121a, 121b, and 121c partitioned by the partition wall 120 and may have a stacked structure of the colored layer 110-1 and the transparent resin layer 110-2.

The first color filter 110a may include a first colored layer 110a-1 and a first transparent resin layer 110a-2 on the first colored layer 110a-1, and the first colored layer 110a-1 and the first transparent resin layer 110a-2 may be isolated in the first section 121a. The second color filter 110b may include a second colored layer 110b-1 and a second transparent resin layer 110b-2 on the second colored layer 110b-1, and the second colored layer 110b-1 and the second transparent resin layer 110b-2 may be located in the second section 121b. The third color filter 110c may include a third colored layer 110c-1 and a third transparent resin layer 110c-2 on the third colored layer 110c-1, and the third colored layer 110c-1 and the third transparent resin layer 110c-2 may be located in the third section 121c.

Each of the first, second, and third colored layers 110a-1, 110b-1, and 110c-1 may be a layer that imparts the aforementioned wavelength selectivity to the first, second, and third color filters 110a, 110b, and 110c, respectively. For example, when the first color filter 110a is a green filter, the first colored layer 110a-1 may be configured to selectively transmit light of a green wavelength spectrum among the visible light wavelength spectrum, and may be configured to absorb and/or reflect light in a blue wavelength spectrum and a red wavelength spectrum except for the green wavelength spectrum. For example, when the second color filter 110b is a red filter, the second colored layer 110b-1 may be configured to selectively transmit light of a red wavelength spectrum among the visible light wavelength spectrum and may be configured to absorb and/or reflect light in a blue wavelength spectrum and a green wavelength spectrum except for the red wavelength spectrum. For example, when the third color filter 110c is a blue filter, the third colored layer 110c-1 may be configured to selectively transmit light in the blue wavelength spectrum among the visible light wavelength spectrum, and may be configured to absorb and/or reflect light in a green wavelength spectrum and a red wavelength spectrum except for the blue wavelength spectrum.

Each of the first, second, and third colored layers 110a-1, 110b-1, and 110c-1 may include a colorant imparting such wavelength selectivity. The colorant may define the aforementioned first, second, or third wavelength spectrum, and may include, for example, a dye, a pigment, or any combination thereof, such as an organic dye, an inorganic dye, an organic-inorganic dye, an organic pigment, an inorganic pigment, an organic-inorganic pigment, or any combination thereof.

For example, when the first color filter 110a is a green filter, the colorant included in the first colored layer 110a-1 may be a green dye, a green pigment, or any combination thereof configured to transmit light of a green wavelength spectrum among the visible light wavelength spectrum, and may further include a yellow dye, a yellow pigment, or any combination thereof. The colorant included in the first colored layer 110a-1 may include, for example, C.I. pigment green 3, C.I. pigment green 7, C.I. pigment green 10, C.I. pigment green 12, C.I. pigment green 13, C.I. pigment green 14, C.I. pigment green 15, C.I. pigment green 16, C.I. pigment green 17, C.I. pigment green 20, C.I. pigment green 25, C.I. pigment green 36, C.I. pigment green 37, C.I. pigment green 47, C.I. pigment green 58, C.I. pigment green 59, C.I. pigment green 62, C.I. pigment green 94, C.I. pigment green 117, C.I. pigment green 125, C.I. pigment green 137, C.I. pigment yellow 1, C.I. pigment yellow 11, C.I. pigment yellow 24, C.I. pigment yellow 31, C.I. pigment yellow 53, C.I. pigment yellow 83, C.I. pigment yellow 93, C.I. pigment yellow 99, C.I. pigment yellow 108, C.I. pigment yellow 109, C.I. pigment yellow 110, C.I. pigment yellow 138, C.I. pigment yellow 139, C.I. pigment yellow 147, C.I. pigment yellow 150, C.I. pigment yellow 151, C.I. pigment yellow 154, C.I. pigment yellow 155, C.I. pigment yellow 167, C.I. pigment yellow 180, C.I. pigment yellow 185, C.I. pigment yellow 199, C.I. pigment yellow 215, C.I. pigment yellow 231, or any combination thereof, but is not limited thereto. Alternatively, the colorant included in the first colored layer 110a-1 may include, for example, triarylmethane or a derivative thereof; xanthene or a derivative thereof; anthraquinone or a derivative thereof; cyanine or a derivative thereof; squarylium or a derivative thereof; quinophthalone or a derivative thereof; phthalocyanine or a derivative thereof; subphthalocyanine or a derivative thereof; an azo dye; dipyrromethene or a derivative thereof; or any combination thereof that transmits light of a green wavelength spectrum among the visible light wavelength spectrum, but is not limited thereto.

For example, when the second color filter 110b is a red filter, the colorant included in the second colored layer 110b-1 may be a red dye, a red pigment, or any combination thereof configured to transmit light of a red wavelength spectrum among the visible light wavelength spectrum and may further include a yellow dye, a yellow pigment, or any combination thereof. The colorant included in the second colored layer 110b-1 may include, for example, C.I. pigment red 9, C.I. pigment red 97, C.I. pigment red 105, C.I. pigment red 122, C.I. pigment red 123, C.I. pigment red 144, C.I. pigment red 149, C.I. pigment red 166, C.I. pigment red 168, C.I. pigment red 176, C.I. pigment red 177, C.I. pigment red 180, C.I. pigment red 192, C.I. pigment red 208, C.I. pigment red 215, C.I. pigment red 216, C.I. pigment red 224, C.I. pigment red 242, C.I. pigment red 254, C.I. pigment red 255, C.I. pigment red 264, C.I. pigment yellow 138, C.I. pigment yellow 139, C.I. pigment yellow 147, C.I. pigment yellow 150, C.I. pigment yellow 151, C.I. pigment yellow 154, C.I. pigment yellow 155, C.I. pigment yellow 167, C.I. pigment yellow 180, C.I. pigment yellow 185, C.I. pigment yellow 199, C.I. pigment yellow 215, C.I. pigment yellow 231, or any combination thereof, but is not limited thereto.

Alternatively, the colorant included in the second colored layer 110b-1 may include, for example, triarylmethane or a derivative thereof; xanthene or a derivative thereof; anthraquinone or a derivative thereof; cyanine or a derivative thereof; squarylium or a derivative thereof; quinophthalone or a derivative thereof; phthalocyanine or a derivative thereof; subphthalocyanine or a derivative thereof; an azo dye; dipyrromethene or a derivative thereof; or any combination thereof configured to transmit light of a red wavelength spectrum among the visible light wavelength spectrum, but is not limited thereto.

For example, when the third color filter 110c is a blue filter, the colorant included in the third colored layer 110c-1 may include a blue dye, a blue pigment, or any combination thereof configured to transmit light of a blue wavelength spectrum among the visible light wavelength spectrum, and may further include a violet dye, a violet pigment, or any combination thereof. The colorant included in the third colored layer 110c-1 may include, for example, C.I. pigment blue 15:3, C.I. pigment blue 15:6, C.I. pigment blue 6, C.I. pigment blue 60, C.I. pigment blue 61, C.I. pigment blue 66, C.I. pigment violet 14, C.I. pigment violet 19, C.I. pigment violet 23, C.I. pigment violet 29, C.I. pigment violet 32, C.I. pigment violet 33, C.I. pigment violet 36, C.I. pigment violet 37, or any combination thereof, but is not limited thereto.

Alternatively, the colorant included in the third colored layer 110c-1 may include, for example, triarylmethane or a derivative thereof; xanthene or a derivative thereof; anthraquinone or a derivative thereof; cyanine or a derivative thereof; squarylium or a derivative thereof; quinophthalone or a derivative thereof; phthalocyanine or a derivative thereof; subphthalocyanine or a derivative thereof; an azo dye; dipyrromethene or a derivative thereof; or any combination thereof configured to transmit light of a blue wavelength spectrum among the visible light wavelength spectrum, but is not limited thereto.

The first, second, and third colored layers 110a-1, 110b-1, and 110c-1 may further include a binder, a dispersant, or any combination thereof, in addition to the aforementioned colorant.

The binder may be, for example, a polymer binder, for example, a copolymer binder including two or more different structural units. The binder may be, for example, a (meth)acrylic binder having a structural unit having one or more (meth)acrylate groups, for example a (meth)acrylic acid/benzyl(meth)acrylate copolymer, a (meth)acrylic acid/benzyl(meth)acrylate/styrene copolymer, a (meth)acrylic acid/benzyl(meth)acrylate/2-hydroxyethyl(meth)acrylate copolymer, a (meth)acrylic acid/benzyl(meth)acrylate/styrene/2-hydroxyethyl(meth)acrylate copolymer, or any combination thereof, but is not limited thereto. The weight average molecular weight of the binder may be about 5,000 to about 15,000 g/mol, or within the above range, about 7,000 to about 12,000 g/mol or about 8,000 to about 12,000 g/mol.

The dispersant may include, for example, a cationic dispersant, an anionic dispersant, an amphoteric dispersant, a silicone-based dispersant, a fluorine-based dispersant, a polymer dispersant, or any combination thereof. The polymer dispersant may include, for example, polymers of unsaturated carboxylic acids or esters thereof, such as polyacrylic acid or polyacrylic acid esters; poly(oxy)alkylene glycol or esters thereof; polyurethane; polyimide; polysiloxane; polyaminoamide; polyethyleneimine; polyarylamine; or any combination thereof, but is not limited thereto.

The first, second, and third colored layers 110a-1, 110b-1, and 110c-1 may be formed without separate heat curing and/or photo-curing, and thus may not contain a crosslinked product of crosslinkable monomers produced by light and/or heat. Accordingly, compared with a conventional color filter including a crosslinked product obtained by curing a composition including a reaction initiator and a crosslinking monomer together with a colorant, a binder, and a dispersant, the content of the colorant may be relatively increased.

For example, a content of the colorant may be greater than or equal to about 50 wt % based on a total weight of the colored layer in which the colorant is included, within the above range, greater than or equal to about 55 wt %, greater than or equal to about 60 wt %, greater than or equal to about 65 wt %, or greater than or equal to about 70 wt %, or within the above range, about 50 wt % to about 95 wt %, about 55 wt % to about 95 wt %, about 60 wt % to about 95 wt %, about 65 wt % to about 95 wt %, about 70 wt % to about 95 wt %, about 50 wt % to about 90 wt %, about 55 wt % to about 90 wt %, about 60 wt % to about 90 wt %, about 65 wt % to about 90 wt % or about 70 wt % to about 90 wt %, based on each of the first, second, or third colored layer 110a-1, 110b-1, or 110c-1.

The content of the binder and/or dispersant may be about 5 wt % to about 50 wt % based on a total weight of the colored layer in which the binder and/or dispersant is included, or within the above range, about 10 wt % to about 50 wt %, about 10 wt % to about 40 wt %, about 10 wt % to about 30 wt %, about 20 wt % to about 50 wt %, about 20 wt % to about 40 wt %, or about 20 wt % to about 30 wt % based on each of the first, second, or third colored layer 110a-1, 110b-1, or 110c-1. For example, the content of the binder may be about 1 wt % to about 50 wt %, or within the above range, about 5 wt % to about 30 wt % or about 10 wt % to about 30 wt % based on each of the first, second, or third colored layer 110a-1, 110b-1, or 110c-1. For example, the content of the dispersant may be about 1 wt % to 50 wt %, or within the above range, about 5 wt % to about 30 wt %, about 10 wt % to about 30 wt %, or about 20 wt % to about 30 wt % based on each of the first, second, or third colored layer 110a-1, 110b-1, or 110c-1.

For example, the total content of the colorant, the binder, and/or the dispersant may be greater than or equal to about 90 wt % based on a total weight of the colored layer in which the colorant, the binder, and/or the dispersant is included, within the above range, greater than or equal to about 92 wt %, greater than or equal to about 95 wt %, greater than or equal to about 97 wt %, or greater than or equal to about 99 wt %, or within the above range, about 90 wt % to about 100 wt %, about 92 wt % to about 100 wt %, about 95 wt % to about 100 wt %, about 97 wt % to about 100 wt %, or about 99 wt % to about 100 wt % based on each of the first, second, or third colored layer 110a-1, 110b-1, or 110c-1.

The thickness of each of the first, second, and third color layers 110a-1, 110b-1, and 110c-1 may be greater than or equal to about 70% of the respective color filters 110a, 110b, and 110c in which the color layers are included, within the above range, greater than or equal to about 75%, greater than or equal to about 80%, greater than or equal to about 85%, or greater than or equal to about 90%, or within the above range, about 70% to about 99%, about 75% to about 99%, about 80% to about 99%, about 85% to about 99%, or about 90% to about 99% of each thicknesses of the first, second, and third color filters 110a, 110b, and 110c. Each of the first, second, and third colored layers 110a-1, 110b-1, and 110c-1 may have a thickness of less than or equal to about 600 nm, or within the above range, about 300 nm to about 600 nm.

The transparent resin layer 110-2 may include first, second, and third transparent resin layers 110a-2, 110b-2, and 110c-2 on the first, second, and third colored layers 110a-1, 110b-1, and 110c-1 in the first, second, and third sections 121a, 121b, and 121c.

The transparent resin layer 110-2 may provide particular (or, alternatively, predetermined) properties required in the process, such as responding to heat and/or light, and each of the first, second, and third colored layers 110a-1, 110b-1, and 110c-1 may be effectively protected in a subsequent process due to high mechanical and chemical resistance properties.

Each of the first, second and third transparent resin layers 110a-2, 110b-2, and 110c-2 may include a cured product of a composition including a reaction initiator and a crosslinkable monomer, and the cured product may be a crosslinked polymer cured by heat and/or light. The crosslinked polymer may provide high mechanical and chemical resistance properties due to a dense crosslinked structure.

The reaction initiator may be a thermal polymerization initiator and/or a photo-polymerization initiator, for example, an acetophenone-based compound, a benzophenone-based compound, a thioxanthone-based compound, a benzoin-based compound, a triazine-based compound, an oxime-based compound, a diazo-based compound, an imidazole-based compound, or any combination thereof, but is not limited thereto.

The crosslinkable monomer may be a thermally crosslinkable monomer and/or a photocrosslinkable monomer, for example a monomer having at least one unsaturated double bond, for example a polyfunctional monomer having two or more functional groups. The crosslinkable monomer may be, for example, a (meth)acrylate compound, an oxetane-based compound, a thiol-containing compound, or any combination thereof, for example, ethylene glycol di(meth)acrylate, diethylene glycol di(meth)acrylate, triethylene glycol di(meth)acrylate, propylene glycol di(meth)acrylate, neopentyl glycol di(meth)acrylate, 1,4-butanediol di(meth)acrylate, 1,6-hexanediol di(meth) acrylate, bisphenol A di(meth)acrylate, pentaerythritol di(meth)acrylate, pentaerythritol tri(meth)acrylate, pentaerythritol tetra(meth)acrylate, pentaerythritol hexa(meth)acrylate, dipentaerythritol di(meth)acrylate, dipentaerythritol tri(meth)acrylate, dipentaerythritol penta(meth)acrylate, dipentaerythritol hexa(meth)acrylate, bisphenol A epoxy (meth)acrylate, ethylene glycol monomethyl ether (meth)acrylate, trimethylolpropane tri(meth)acrylate, tris(meth) acryloyloxyethyl phosphate, novolac epoxy (meth)acrylate, or any combination thereof, but is not limited thereto.

Each of the first, second, and third transparent resin layers 110a-2, 110b-2, and 110c-2 includes a crosslinked polymer cured by heat and/or light, thereby having high mechanical and chemical resistance properties. For example, each of the first, second, and third transparent resin layers 110a-2, 110b-2, and 110c-2 may have low solubility in an organic solvent such as N-methyl-2-pyrrolidone (NMP), acid solvents, and/or alkaline solvents used in a subsequent process. For example, solubility in organic solvents such as N-methyl-2-pyrrolidone (NMP), acid solvents, and/or alkaline solvents (for 1000 ml or 1 kg of solvent) may be less than about 1 g/l kg (about 1 g/1000 ml) (for 1000 ml or 1 kg of solvent), and within the above range, less than or equal to about 0.8 g/l kg (about 0.8 g/1000 ml), less than or equal to about 0.8 g/l kg (about 0.8 g/1000 ml), less than or equal to about 0.5 g/l kg (about 0.5 g/1000 ml), less than or equal to about 0.3 g/l kg (about 0.3 g/1000 ml), or less than or equal to about 0.1 g/l kg (about 0.1 g/1000 ml), for example substantially zero.

Each of the first, second and third transparent resin layers 110a-2, 110b-2, and 110c-2 may further include one or more additives in addition to the aforementioned cured product (crosslinked polymer). The additive may be, for example, an antioxidant, an adhesion promoter, an ultraviolet absorber, an infrared absorber, an anti-aggregation agent, a surfactant, or any combination thereof, but is not limited thereto.

Each of the first, second, and third transparent resin layers 110a-2, 110b-2, and 110c-2 may have high light transmittance with respect to a visible light wavelength spectrum, and accordingly, loss of light flowing into each of the first, second, and third colored layers 110a-1, 110b-1, and 110c-1 may be prevented. For example, each of the first, second and third transparent resin layers 110a-2, 110b-2, and 110c-2 may have an average light transmittance of about 90% to about 100%, or within the above range, about 92% to about 100%, about 94% to about 100%, about 95% to about 100%, about 97% to about 100%, about 98% to about 100%, or about 99% to about 100% in a wavelength spectrum of about 400 nm to about 700 nm.

The transparent resin layer 110-2 may be thinner than the colored layer 110-1. For example, the transparent resin layer 110-2 may have a thickness that is less than or equal to about 30%, within the above range, less than or equal to about 25%, less than or equal to about 20%, less than or equal to about 15%, or less than or equal to about 10%, or within the above range, about 1% to about 30%, about 1% to about 25%, about 1% to about 20%, about 1% to about 15%, or about 1% to about 10% of each thickness of the first, second, and third color filters 110a, 110b, and 110c. The thickness of the transparent resin layer 110-2 may be, for example, less than about 200 nm, or within the above range, about 5 nm to about 180 nm, about 5 nm to about 150 nm, about 5 nm to about 100 nm, about 5 nm to about 90 nm, about 5 nm to about 80 nm, about 5 nm to about 60 nm, or about 5 nm to about 50 nm.

The color filter array 100 includes a planarization layer 130 on the color filter 110. The planarization layer 130 may be a common layer on the first, second, and third color filters 110a, 110b, and 110c and the partition wall 120 and may remove a step difference caused by the first, second, and third color filters 110a, 110b, and 110c and the partition wall 120 to planarize the surfaces thereof. The planarization layer 130 may be omitted.

The color filter array 100 may further include a focusing lens 140 on the color filter 110 and the planarization layer 130. The focusing lens 140 may collect the light to a single point by controlling the direction of the incident light at a light incident position. The focusing lens 140 may have a shape of, for example, a cylinder or a hemisphere, but is not limited thereto.

Incident light may be introduced into the focusing lens 140, the planarization layer 130, the transparent resin layer 110-2, the colored layer 110-1, and the partition wall 120, and a refractive index of each layer may gradually decrease along a path of the light. In other words, a refractive index of the focusing lens 140 may be higher than that of the planarization layer 130, the refractive index of the planarization layer 130 may be higher than that of the transparent resin layer 110-2, the refractive index of the transparent resin layer 110-2 may be higher than that of the colored layer 110-1, and the refractive index of the colored layer 110-1 may be higher than that of the partition wall 120. Accordingly, the refractive index of each layer may be controlled to reduce or prevent reflection and/or absorption of the light and substantially achieve a total reflection, so that the light may be effectively reach the colored layer 110-1 and a lower portion thereof.

As described above, each color filter 110a, 110b, and 110c of the color filter array 100 according to some example embodiments includes the colored layer 110-1 imparting wavelength selectivity and the transparent resin layer 110-2 providing processability such as photosensitivity and mechanical/chemical resistance properties as separate layers, which may increase a content of a colorant such as a dye and/or a pigment in the colored layer 110-1.

Accordingly, compared with a conventional color filter obtained by curing a composition including a colorant, a binder, a dispersant, a reaction initiator, and a crosslinkable monomer, the content of the colorant in the colored layer 110-1 may be increased at the same thickness, or even the same content of the colorant may be formed into a thinner color filter. For example, each color filter 110a, 110b, and 110c of the color filter array 100 according to the some example embodiments includes at least about 50 wt % or more of the colorant with respect to that of the colored layer 110-1, which is about 2 to 3 times higher than at most about 20 wt % to about 30 wt % in the conventional color filter, or the same content of the colorant may contribute to reducing a thickness of each color filter 110a, 110b, and 110c to be about ½ to about ⅓ or less. Accordingly, a color filter having a thinner thickness than that of the conventional color filter as well as maintaining the wavelength separation characteristics may be realized, for example, each sub-micrometer color filter 110a, 110b, and 110c having a pitch of less than about 1 µm, less than or equal to about 800 nm, or less than or equal to about 500 nm may be effectively realized.

While FIGS. 1-3 illustrate a color filter array that includes a partition wall defining multiple sections 121, and multiple separate color filters 110 in separate respective sections and configured to selectively transmit separate, respective wavelength spectra within the visible light wavelength spectrum, example embodiments are not limited thereto. In some example embodiments, the color filter array may include a partition wall 120 that defining at least one section 121 (e.g., a single section); and a color filter 110 in the section, the color filter 110 configured to selectively transmit light in a wavelength spectrum belonging to a limited portion of a visible light wavelength spectrum (e.g., green, blue, or red wavelength spectra), where the color filter 110 includes a colored layer 110-1 in the section 121, the colored layer 110-1 including a colorant defining the wavelength spectrum, and a transparent resin layer 110-2 on the colored layer 110-1 in the section 121. For example, the color filter array 100 may include a partition wall defining multiple, separate sections 121 in which separate color filters 110 are located, where the color filters 110 may each be configured to selective transmit light of a same particular color wavelength spectrum.

Hereinafter, an example of a method of manufacturing the aforementioned color filter array 100 is described.

FIGS. 3, 4, 5, 6, 7, 8, 9, 10, 11, and 12 are cross-sectional views sequentially showing examples of a method of manufacturing the color filter array shown in FIGS. 1 and 2.

An example of a method of manufacturing the color filter array 100 according to some example embodiments includes forming a partition wall 120 defining a plurality of sections 121 that are partitioned from each other by the partition wall 120, the plurality of sections 121 including the first, second, and third sections 121a, 121b, and 121c, forming a first color filter 110a configured to selectively transmit light of a first wavelength spectrum belonging to a visible light wavelength spectrum in the first section 121a, forming a second color filter 110b configured to selectively transmit light of a second wavelength spectrum belonging to the visible light wavelength spectrum in the second section 121b, and forming a third color filter 110c configured to selectively transmit light of a third wavelength spectrum belonging to a visible light wavelength spectrum in the third section 121c.

Referring to FIG. 3, an insulation layer for a partition wall is formed to have a particular (or, alternatively, predetermined) thickness on a substrate (not shown) and then, patterned through photolithography to form the partition wall 120, for example, having a lower surface 120p and a grid-patterned sidewall 120q. The partition wall 120 may partition a plurality of sections 121 including first, second, and third sections 121a, 121b, and 121c by the grid-patterned sidewall 120q.

Subsequently, in the first section 121a, the first color filter 110a is formed.

The forming of the first color filter 110a includes forming a first colored layer 110a-1, forming a first transparent resin layer 110a-2 on the first colored layer 110a-1, and selectively curing the first transparent resin layer 110a-2 in the first section 121a to remove the first colored layer 110a-1 and the first transparent resin layer 110a-2 remaining other than the first section 121a and selectively form the first colored layer 110a-1 and the first transparent resin layer 110a-2 in the first section 121a.

Referring to FIG. 4, a first coloring composition 110a-1C for the first colored layer 110a-1 is applied on the partition wall 120. The first coloring composition 110a-1C may include a first colorant defining a first wavelength spectrum; a binder, a dispersant, or any combination thereof; and a solvent.

For example, when the first color filter 110a is a green filter, the first colorant may be a green dye, a green pigment, or any combination thereof that configured to transmit light of a green wavelength spectrum among the visible light wavelength spectrum, and may further include a yellow dye, a yellow pigment, or any combination thereof. The first colorant may include, for example, C.I. pigment green 3, C.I. pigment green 7, C.I. pigment green 10, C.I. pigment green 12, C.I. pigment green 13, C.I. pigment green 14, C.I. pigment green 15, C.I. pigment green 16, C.I. pigment green 17, C.I. pigment green 20, C.I. pigment green 25, C.I. pigment green 36, C.I. pigment green 37, C.I. pigment green 47, C.I. pigment green 58, C.I. pigment green 59, C.I. pigment green 62, C.I. pigment green 94, C.I. pigment green 117, C.I. pigment green 125, C.I. pigment green 137, C.I. pigment yellow 1, C.I. pigment yellow 11, C.I. pigment yellow 24, C.I. pigment yellow 31, C.I. pigment yellow 53, C.I. pigment yellow 83, C.I. pigment yellow 93, C.I. pigment yellow 99, C.I. pigment yellow 108, C.I. pigment yellow 109, C.I. pigment yellow 110, C.I. pigment yellow 138, C.I. pigment yellow 139, C.I. pigment yellow 147, C.I. pigment yellow 150, C.I. pigment yellow 151, C.I. pigment yellow 154, C.I. pigment yellow 155, C.I. pigment yellow 167, C.I. pigment yellow 180, C.I. pigment yellow 185, C.I. pigment yellow 199, C.I. pigment yellow 215, C.I. pigment yellow 231, or any combination thereof, but is not limited thereto.

Alternatively, the first colorant may include, for example, triarylmethane or a derivative thereof; xanthene or a derivative thereof; anthraquinone or a derivative thereof; cyanine or a derivative thereof; squarylium or a derivative thereof; quinophthalone or a derivative thereof; phthalocyanine or a derivative thereof; subphthalocyanine or a derivative thereof; an azo dye; dipyrromethene or a derivative thereof; or any combination thereof that configured to transmit light of a green wavelength spectrum among the visible light wavelength spectrum, but is not limited thereto.

The binder may be, for example, a polymer binder, for example, a copolymer binder including two or more different structural units. The binder may be, for example, a (meth)acrylic binder having a structural unit having one or more (meth)acrylate groups, for example a (meth)acrylic acid/benzyl(meth)acrylate copolymer, a (meth)acrylic acid/benzyl(meth)acrylate/styrene copolymer, a (meth)acrylic acid/benzyl(meth)acrylate/2-hydroxyethyl(meth)acrylate copolymer, a (meth)acrylic acid/benzyl(meth)acrylate/styrene/2-hydroxyethyl(meth)acrylate copolymer, or any combination thereof, but is not limited thereto. The weight average molecular weight of the binder may be about 5,000 to about 15,000 g/mol, or within the above range, about 7,000 to about 12,000 g/mol, or about 8,000 to about 12,000 g/mol, but is not limited thereto.

The dispersant may include, for example, a cationic dispersant, an anionic dispersant, an amphoteric dispersant, a silicone-based dispersant, a fluorine-based dispersant, a polymer dispersant, or any combination thereof. The polymer dispersant may include, for example, polymers of unsaturated carboxylic acids or esters thereof, such as polyacrylic acid or polyacrylic acid esters; poly(oxy)alkylene glycol or esters thereof; polyurethane; polyimide; polysiloxane; polyaminoamide; polyethyleneimine; polyarylamine; or any combination thereof, but is not limited thereto.

The solvent is not particularly limited as long as it may dissolve or disperse the first colorant and the binder and/or dispersant described above, but may be, for example, alcohols such as methanol, ethanol, and the like; ethers such as dichloroethyl ether, n-butyl ether, diisoamyl ether, methylphenyl ether, tetrahydrofuran, and the like; glycol ethers such as ethylene glycol methylether, ethylene glycol ethylether, propylene glycol methylether, and the like; cellosolve acetates such as methyl cellosolve acetate, ethyl cellosolve acetate, diethyl cellosolve acetate, and the like; carbitols such as methylethyl carbitol, diethyl carbitol, diethylene glycolmonomethylether, diethylene glycol monoethylether, diethylene glycol dimethylether, diethylene glycol methylethylether, diethylene glycol diethylether, and the like; propylene glycol alkylether acetates such as propylene glycol methylether acetate, propylene glycol propylether acetate, and the like; aromatic hydrocarbons such as toluene, xylene, and the like; ketones such as methylethylketone, cyclohexanone, 4-hydroxy-4-methyl-2-pentanone, methyl-n-propylketone, methyl-n-butylketone, methyl-n-amylketone, 2-heptanone, and the like; saturated aliphatic monocarboxylic acid alkyl esters such as ethyl acetate, n-butyl acetate, isobutyl acetate, and the like; alkyl lactate esters such as methyl lactate, ethyl lactate, and the like; alkyl hydroxyacetate esters such as methyl hydroxyacetate, ethyl hydroxyacetate, butyl hydroxyacetate, and the like; alkoxyalkyl acetate esters such as methoxymethyl acetate, methoxyethyl acetate, methoxybutyl acetate, ethoxymethyl acetate, ethoxyethyl acetate, and the like; 3-hydroxypropionic acid alkyl esters such as methyl 3-hydroxypropionate, ethyl 3-hydroxypropionate, and the like; 3-alkoxypropionic acid alkyl esters such as methyl 3-methoxypropionate, ethyl 3-methoxypropionate, ethyl 3-ethoxypropionate, methyl 3-ethoxypropionate, and the like; 2-hydroxypropionic acid alkyl esters such as methyl 2-hydroxypropionate, ethyl 2-hydroxypropionate, propyl 2-hydroxypropionate, and the like; 2-alkoxypropionic acid alkyl esters such as methyl 2-methoxypropionate, ethyl 2-methoxypropionate, ethyl 2-ethoxypropionate, methyl 2-ethoxypropionate, and the like; 2-hydroxy-2-methylpropionic acid alkyl esters such as methyl 2-hydroxy-2-methylpropionate, ethyl 2-hydroxy-2-methylpropionate, and the like; 2-alkoxy-2-methylpropionic acid alkyl esters such as methyl 2-methoxy-2-methylpropionate, ethyl 2-ethoxy-2-methylpropionate, and the like; esters such as 2-hydroxyethyl propionate, 2-hydroxy-2-methylethyl propionate, hydroxyethyl acetate, methyl 2-hydroxy-3-methylbutanoate, and the like; ketone esters such as ethyl pyruvate, and the like; N-methylformamide; N,N-dimethyl formamide; N-methylformanilide; N-methylacetamide; N,N-dimethyl acetamide; N-methylpyrrolidone; dimethylsulfoxide; benzylethylether; dihexylether; acetylacetone; isophorone; caproic acid; caprylic acid; 1-octanol; 1-nonanol; benzylalcohol; benzyl acetate; ethyl benzoate; diethyl oxalate; diethyl maleate; γ-butyrolactone; ethylene carbonate; propylene carbonate; phenyl cellosolve acetate, or any combination thereof, but is not limited thereto.

A content of the first colorant may be greater than or equal to about 50 wt % based on a solid content of the first coloring composition 110a-1C, within the above range, greater than or equal to about 55 wt %, greater than or equal to about 60 wt %, greater than or equal to about 65 wt %, or greater than or equal to about 70 wt %, or within the above range, about 50 wt % to about 95 wt %, about 55 wt % to about 95 wt %, about 60 wt % to about 95 wt %, about 65 wt % to about 95 wt %, about 70 wt % to about 95 wt %, about 50 wt % to about 90 wt %, about 55 wt % to about 90 wt %, about 60 wt % to about 90 wt %, about 65 wt % to about 90 wt % or about 70 wt % to about 90 wt % based on the solid content (excluding the solvent) of the first coloring composition 110a-1C.

A content of the binder and/or the dispersant may be about 5 wt % to about 50 wt % based on a solid content of the first coloring composition 110a-1C, within the above range, about 10 wt % to about 50 wt %, about 10 wt % to about 40 wt %, about 10 wt % to about 30 wt %, about 20 wt % to about 50 wt %, about 20 wt % to about 40 wt %, or about 20 wt % to about 30 wt % based on the solid content (excluding the solvent) of the first coloring composition 110a-1C.

For example, a total content of the first colorant and the binder and/or the dispersant may be greater than or equal to about 90 wt % based on a solid content of the first coloring composition 110a-1C, within the above range, greater than or equal to about 92 wt %, greater than or equal to about 95 wt %, greater than or equal to about 97 wt %, or greater than or equal to about 99 wt %, or within the above range, about 90 wt % to about 100 wt %, about 92 wt % to about 100 wt %, about 95 wt % to about 100 wt %, about 97 wt % to about 100 wt %, or about 99 wt % to about 100 wt % based on the solid content (excluding the solvent) of the first coloring composition 110a-1C.

For example, the first coloring composition 110a-1C may not include a reaction initiator such as a thermal initiator and/or a photoinitiator; and a crosslinkable monomer (excluding the binder and the dispersant). The first coloring composition 110a-1C may not include (e.g., may exclude) any reaction initiators and may not include (e.g., may exclude) any crosslinkable monomers (excluding the binder and the dispersant) For example, the first coloring composition 110a-1C may not include an acetophenone-based compound, a benzophenone-based compound, a thioxanthone-based compound, a benzoin-based compound, a triazine-based compound, an oxime-based compound, a diazo-based compound, an imidazole-based compound, or any combination thereof. For example, the first coloring composition 110a-1C may not include ethylene glycoldi(meth) acrylate, diethylene glycoldi(meth)acrylate, triethylene glycoldi(meth)acrylate, propylene glycoldi(meth)acrylate, neopentylglycoldi(meth)acrylate, 1,4-butanedioldi(meth)acrylate, 1,6-hexanedioldi(meth)acrylate, bisphenol A di(meth)acrylate, pentaerythritoldi(meth)acrylate, pentaerythritoltri(meth)acrylate, pentaerythritoltetra(meth)acrylate, pentaerythritolhexa(meth)acrylate, dipentaerythritoldi(meth)acrylate, dipentaerythritoltri(meth)acrylate, dipentaerythritolpenta(meth)acrylate, dipentaerythritolhexa(meth)acrylate, bisphenol A epoxy(meth)acrylate, ethylene glycolmonomethylether (meth)acrylate, trimethylolpropanetri(meth)acrylate, tris(meth)acryloyloxyethylphosphate, novolac epoxy(meth)acrylate, or any combination thereof.

For example, the first coloring composition 110a-1C may be made of a first colorant, a binder, and a dispersant as a solid content (e.g., amount, by weight, of the first coloring composition excluding solvent).

The first coloring composition 110a-1C may be applied by, for example, a solution process such as spin coating, slit coating, inkjet coating, or dip coating, but is not limited thereto. The first coloring composition 110a-1C may be filled on the partition wall 120 and in all the sections 121 including the first, second, and third sections 121a, 121b, and 121c of the partition wall 120.

Next, the applied first coloring composition 110a-1C is annealed. The annealing may be performed, for example, at about 50° C. to about 120° C. for about 5 minutes to about 10 hours, wherein the solvent is removed from the applied first colored composition 110a-1C by the annealing, and the first colored layer 110a-1 may be formed in all sections 121 including the first, second, and third sections 121a, 121b, and 121c.

Next, Referring to FIG. 5, the transparent composition 110a-2C for a transparent resin layer is applied on the first colored layer 110a-1. The transparent composition 110a-2C may be a thermosetting composition and/or a photocurable composition, and may include a reaction initiator, a crosslinkable monomer, an additive, and a solvent.

The reaction initiator may be a thermal polymerization initiator and/or a photopolymerization initiator, for example, an acetophenone-based compound, a benzophenone-based compound, a thioxanthone-based compound, a benzoin-based compound, a triazine-based compound, an oxime-based compound, a diazo-based compound, an imidazole-based compound, or any combination thereof, but is not limited thereto.

The crosslinkable monomer may be a thermally crosslinkable monomer and/or a photocrosslinkable monomer, for example a monomer having at least one unsaturated double bond, for example a polyfunctional monomer having two or more functional groups. The crosslinkable monomer may be, for example, a (meth)acrylate compound, an oxetane-based compound, a thiol group-containing compound, or any combination thereof, for example, ethylene glycol di(meth)acrylate, diethylene glycol di(meth)acrylate, triethylene glycol di(meth)acrylate, propylene glycol di(meth)acrylate, neopentyl glycol di(meth)acrylate, 1,4-butanediol di(meth)acrylate, 1,6-hexanediol di(meth) acrylate, bisphenol A di(meth)acrylate, pentaerythritol di(meth)acrylate, pentaerythritol tri(meth)acrylate, pentaerythritol tetra(meth)acrylate, pentaerythritol hexa(meth)acrylate, dipentaerythritol di(meth)acrylate, dipentaerythritol tri(meth)acrylate, dipentaerythritol penta(meth)acrylate, dipentaerythritol hexa(meth)acrylate, bisphenol A epoxy (meth)acrylate, ethylene glycol monomethyl ether (meth)acrylate, trimethylolpropane tri(meth)acrylate, tris(meth) acryloyloxyethyl phosphate, novolac epoxy (meth)acrylate, or any combination thereof, but is not limited thereto.

The additive may be, for example, an antioxidant, an adhesion promoter, an ultraviolet absorber, an infrared absorber, an anti-aggregation agent, a surfactant, or any combination thereof, but is not limited thereto.

The solvent is not particularly limited as long as it may dissolve or disperse the reaction initiator, the crosslinkable monomer, and the additive and may be selected from the aforementioned solvents.

A content of the reaction initiator may be about 0.1 wt % to about 30 wt % based on the solid content (excluding the solvent) of the transparent composition 110a-2C, the crosslinkable monomer may be included in an amount of about 20 wt % to about 99 wt % based on the solid content (excluding the solvent) of the transparent composition 110a-2C, and a content of the additive may be about 0.0001 wt % to about 10 wt % based on the solid content (excluding the solvent) of the transparent composition 110a-2C.

The applying of the transparent composition 110a-2C may be performed by, for example, a solution process such as spin coating, slit coating, inkjet coating, or dip coating, but is not limited thereto. The transparent composition 110a-2C may be applied on the partition wall 120 and on the first colored layer 110a-1 in all the sections 121 including the first, second, and third sections 121a, 121b, and 121c of the partition wall 120.

Subsequently, a mask 30 is disposed on the applied transparent composition 110a-2C and then, exposed to light. The mask 30 includes an opening 30a and a light-blocking portion 30b, and the opening 30a is disposed at a position corresponding to the first section 121a. Subsequently, the mask 30 is irradiated by light such as UV to selectively expose the transparent composition 110a-2C in the first section 121a to the light and cure it by negative photolithography, thereby defining at least one exposed portion of the transparent composition 110a-2C and at least one unexposed portion of the transparent composition 110a-2C.

Referring to FIG. 6, the non-exposed portions of transparent composition 110a-2C and first coloring composition 110a-1C other than the first section 121a (e.g., outside the first section 121a) are all removed through development to selectively form a first colored layer 110a-1 and a first transparent resin layer 110a-2 in the first section 121a. The first colored layer 110a-1 and the first transparent resin layer 110a-2 in the first section 121a form the first color filter 110a.

Subsequently, the second color filter 110b is formed in the second section 121b.

The forming of the second color filter 110b in the second section 121b may be performed through the same process as the aforementioned forming of the first color filter 110a.

For example, the forming of the second color filter 110b includes forming a second colored layer 110b-1, forming a second transparent resin layer 110b-2 on the second colored layer 110b-1, selectively curing a second transparent resin layer 110b-2 in the second section 121b to remove the second colored layer 110b-1 and the second transparent resin layer 110b-2 other than the second section 121b and to selectively form the second colored layer 110b-1 and the second transparent resin layer 110b-2 in the second section 121b.

Referring to FIG. 7, a second coloring composition 110b-1C for the second colored layer 110b-1 is applied on the partition wall 120. The second coloring composition 110b-1C may include a second colorant defining a second wavelength spectrum; a binder, a dispersant, or any combination thereof; and a solvent.

For example, when the second color filter 110b is a red filter, the second colorant may be a red dye, a red pigment, or any combination thereof that configured to transmit light of a red wavelength spectrum among the visible light wavelength spectrum, and may further include a yellow dye, a yellow pigment, or any combination thereof. The second colorant may include, for example, C.I. pigment red 9, C.I. pigment red 97, C.I. pigment red 105, C.I. pigment red 122, C.I. pigment red 123, C.I. pigment red 144, C.I. pigment red 149, C.I. pigment red 166, C.I. pigment red 168, C.I. pigment red 176, C.I. pigment red 177, C.I. pigment red 180, C.I. pigment red 192, C.I. pigment red 208, C.I. pigment red 215, C.I. pigment red 216, C.I. pigment red 224, C.I. pigment red 242, C.I. pigment red 254, C.I. pigment red 255, C.I. pigment red 264, C.I. pigment yellow 138, C.I. pigment yellow 139, C.I. pigment yellow 147, C.I. pigment yellow 150, C.I. pigment yellow 151, C.I. pigment yellow 154, C.I. pigment yellow 155, C.I. pigment yellow 167, C.I. pigment yellow 180, C.I. pigment yellow 185, C.I. pigment yellow 199, C.I. pigment yellow 215, C.I. pigment yellow 231, or any combination thereof, but is not limited thereto.

Alternatively, the second colorant may include, for example, triarylmethane or a derivative thereof; xanthene or a derivative thereof; anthraquinone or a derivative thereof; cyanine or a derivative thereof; squarylium or a derivative thereof; quinophthalone or a derivative thereof; phthalocyanine or a derivative thereof; subphthalocyanine or a derivative thereof; an azo dye; dipyrromethene or a derivative thereof; or any combination thereof that configured to transmit light of a red wavelength spectrum among the visible light wavelength spectrum, but is not limited thereto.

The binder, the dispersant, and the solvent are the same as described above.

A content of the second colorant may be greater than or equal to about 50 wt % within the above range, greater than or equal to about 55 wt %, greater than or equal to about 60 wt %, greater than or equal to about 65 wt %, or greater than or equal to about 70 wt %, or within the above range, about 50 wt % to about 95 wt %, about 55 wt % to about 95 wt %, about 60 wt % to about 95 wt %, about 65 wt % to about 95 wt %, about 70 wt % to about 95 wt %, about 50 wt % to about 90 wt %, about 55 wt % to about 90 wt %, about 60 wt % to about 90 wt %, about 65 wt % to about 90 wt % or about 70 wt % to about 90 wt % based on the solid content (excluding the solvent) of the second coloring composition 110b-1C.

A content of the binder and/or the dispersant may be about 5 wt % to about 50 wt %, within the above range, about 10 wt % to about 50 wt %, about 10 wt % to about 40 wt %, about 10 wt % to about 30 wt %, about 20 wt % to about 50 wt %, about 20 wt % to about 40 wt %, or about 20 wt % to about 30 wt % based on the solid content (excluding the solvent) of the second coloring composition 110b-1C.

For example, a total content of the second colorant and the binder and/or the dispersant may be greater than or equal to about 90 wt %, within the above range, greater than or equal to about 92 wt %, greater than or equal to about 95 wt %, greater than or equal to about 97 wt %, or greater than or equal to about 99 wt %, or within the above range, about 90 wt % to about 100 wt %, about 92 wt % to about 100 wt %, about 95 wt % to about 100 wt %, about 97 wt % to about 100 wt %, or about 99 wt % to about 100 wt % based on the solid content (excluding the solvent) of the second coloring composition 110b-1C.

For example, the second coloring composition 110b-1C may not include a reaction initiator such as a thermal initiator and/or a photoinitiator; and a crosslinkable monomer (excluding the binder and dispersant). The reaction initiator and the crosslinkable monomer are the same as described above. For example, the second coloring composition 110b-1C may be made of the second colorant, the binder, and the dispersant as a solid content.

The second coloring composition 110b-1C may be applied by, for example, a solution process such as spin coating, slit coating, inkjet coating, or dip coating, but is not limited thereto. The second coloring composition 110b-1C may be filled on the partition wall 120 and in all the sections 121 including the first, second, and third sections 121a, 121b, and 121c of the partition wall 120.

The applied second coloring composition 110b-1C is then annealed. The annealing may be performed, for example, at about 50° C. to about 120° C. for about 5 minutes to about 10 hours, wherein the solvent is removed from the applied second coloring composition 110b-1C by the annealing, and the second colored layer 110b-1 may be formed in all sections 121 including the first, second, and third sections 121a, 121b, and 121c.

Referring to FIG. 8, a transparent composition 110b-2C for a transparent resin layer is applied on the second colored layer 110b-1. The transparent composition 110b-2C may be a thermosetting composition and/or a photocurable composition, and may include a reaction initiator, a crosslinkable monomer, an additive, and a solvent. The reaction initiator, the crosslinkable monomer, the additive, and the solvent are the same as described above.

The applying of the transparent composition 110b-2C may be performed by, for example, a solution process such as spin coating, slit coating, inkjet coating, or dip coating, but is not limited thereto. The transparent composition 110b-2C may be applied on the partition wall 120 and on the second colored layer 110b-1 in all the sections 121 including the first, second, and third sections 121a, 121b, and 121c of the partition wall 120.

Subsequently, a mask 30 is disposed on the applied transparent composition 110b-2C and then, exposed to light. The mask 30 includes an opening 30a and a light-blocking portion 30b, and the opening 30a is disposed at a position corresponding to the second section 121b. Subsequently, the mask 30 is irradiated by light such as UV to selectively expose the transparent composition 110b-2C to the light and cure it in the second section 121b by negative photolithography, thereby defining at least one exposed portion of the transparent composition 110b-2C and at least one unexposed portion of the transparent composition 110b-2C.

Referring to FIG. 9, the non-exposed portions of the transparent composition 110b-2C and second colored layer composition 110b-1C other than (e.g., outside) the second section 121b are all removed through development to form a second colored layer 110b-1 and a second transparent resin layer 110b-2 in the second section 121b. The second colored layer 110b-1 and the second transparent resin layer 110b-2 in the second section 121b form the second color filter 110b.

Next, a third color filter 110c is formed in the third section 121c.

The forming of the third color filter 110c in the third section 121c may be performed through the same process as the aforementioned forming of the first color filter 110a and the second color filter 110b.

For example, the forming of the third color filter 110c includes forming a third colored layer 110c-1, forming a third transparent resin layer 110c-2 on the third colored layer 110c-1, selectively curing the third transparent resin layer 110c-2 in the third section 121c by removing the third colored layer 110c-1 and the transparent resin layer 110c-2 remaining other than the third section 121c to form the third colored layer 110c-1 and the third transparent resin layer 110c-2 in the third section 121c.

Referring to FIG. 10, a third coloring composition 110c-1C for the third colored layer 110c-1 is applied on the partition wall 120. The third coloring composition 110c-1C may include a third colorant defining a third wavelength spectrum; a binder, a dispersant, or any combination thereof; and a solvent.

For example, when the third color filter 110c is a blue filter, the third colorant may include a blue dye, a blue pigment, or any combination thereof that configured to transmit light of a blue wavelength spectrum among the visible light wavelength spectrum, and may further include a violet dye, a violet pigment, or any combination thereof. The third colorant may include, for example, C.I. pigment blue 15:3, C.I. pigment blue 15:6, C.I. pigment blue 6, C.I. pigment blue 60, C.I. pigment blue 61, C.I. pigment blue 66, C.I. pigment violet 14, C.I. pigment violet 19, C.I. pigment violet 23, C.I. pigment violet 29, C.I. pigment violet 32, C.I. pigment violet 33, C.I. pigment violet 36, C.I. pigment violet 37, or any combination thereof, but is not limited thereto.

Alternatively, the third colorant may include, for example, triarylmethane or a derivative thereof; xanthene or a derivative thereof; anthraquinone or a derivative thereof; cyanine or a derivative thereof; squarylium or a derivative thereof; quinophthalone or a derivative thereof; phthalocyanine or a derivative thereof; subphthalocyanine or a derivative thereof; an azo dye; dipyrromethene or a derivative thereof; or any combination thereof that is configured to transmit light of a blue wavelength spectrum among the visible light wavelength spectrum, but is not limited thereto.

The binder, the dispersant, and the solvent are the same as described above.

A content of the third colorant may be greater than or equal to about 50 wt % within the above range, greater than or equal to about 55 wt %, greater than or equal to about 60 wt %, greater than or equal to about 65 wt %, or greater than or equal to about 70 wt %, or within the above range, about 50 wt % to about 95 wt %, about 55 wt % to about 95 wt %, about 60 wt % to about 95 wt %, about 65 wt % to about 95 wt %, about 70 wt % to about 95 wt %, about 50 wt % to about 90 wt %, about 55 wt % to about 90 wt %, about 60 wt % to about 90 wt %, about 65 wt % to about 90 wt % or about 70 wt % to about 90 wt % based on the solid content (excluding the solvent) of the third coloring composition 110c-1C.

A content of the binder and/or the dispersant may be about 5 wt % to about 50 wt %, within the above range, about 10 wt % to about 50 wt %, about 10 wt % to about 40 wt %, about 10 wt % to about 30 wt %, about 20 wt % to about 50 wt %, about 20 wt % to about 40 wt %, or about 20 wt % to about 30 wt % based on the solid content (excluding the solvent) of the third coloring composition 110c-1C.

For example, a total content of the third colorant and the binder and/or the dispersant may be greater than or equal to about 90 wt %, within the above range, greater than or equal to about 92 wt %, greater than or equal to about 95 wt %, greater than or equal to about 97 wt %, or greater than or equal to about 99 wt %, or within the above range, about 90 wt % to about 100 wt %, about 92 wt % to about 100 wt %, about 95 wt % to about 100 wt %, about 97 wt % to about 100 wt %, or about 99 wt % to about 100 wt % based on the solid content (excluding the solvent) of the third coloring composition 110c-1C.

For example, the third coloring composition 110c-1C may not include a reaction initiator (e.g., may not include any reaction initiators) such as a thermal initiator and/or a photoinitiator; and a crosslinkable monomer (e.g., may not include any crosslinkable monomers) (excluding the binder and dispersant). The reaction initiator and the crosslinkable monomer are the same as described above. For example, the third coloring composition 110c-1C may be made of the third colorant, the binder, and the dispersant as a solid content.

The third coloring composition 110c-1C may be applied by, for example, a solution process such as spin coating, slit coating, inkjet coating, or dip coating, but is not limited thereto. The third coloring composition 110c-1C may be filled on the partition wall 120 and in all the sections 121 including the first, second, and third sections 121a, 121b, and 121c of the partition wall 120.

The applied third coloring composition 110c-1C is then annealed. The annealing may be performed, for example, at about 50° C. to about 120° C. for about 5 minutes to about 10 hours, wherein the solvent is removed from the applied third coloring composition 110c-1C by the annealing, and the third colored layer 110c-1 may be formed in all sections 121 including the first, second, and third sections 121a, 121b, and 121c.

Referring to FIG. 11, a transparent composition 110c-20 for a transparent resin layer is applied on the third colored layer 110c-1. The transparent composition 110c-20 may be a thermosetting composition and/or a photocurable composition, and may include a reaction initiator, a crosslinkable monomer, an additive, and a solvent. The reaction initiator, the crosslinkable monomer, the additive, and the solvent are the same as described above.

The applying of the transparent composition 110c-20 may be performed by, for example, a solution process such as spin coating, slit coating, inkjet coating, or dip coating, but is not limited thereto. The transparent composition 110c-20 may be applied on the partition wall 120 and on the third colored composition 110c-1C in all the sections 121 including the first, second, and third sections 121a, 121b, and 121c of the partition wall 120.

Subsequently, a mask 30 is disposed on the applied transparent composition 110c-20 and then, exposed to light. The mask 30 includes an opening 30a and a light-blocking portion 30b, and the opening 30a is located at a position corresponding to the third section 121c. Subsequently, the mask 30 is irradiated by light such as UV to selectively cure the transparent composition 110c-20 in the third section 121c by negative photolithography, thereby defining at least one exposed portion of the transparent composition 110c-20 and at least one unexposed portion of the transparent composition 110c-20.

Referring to FIG. 12, the non-exposed portions of the transparent composition 110c-20 and the third colored composition 110c-1C other than the third section 121c are all removed through development to selectively form a third colored layer 110c-1 and a third transparent resin layer 110c-2 in the third section 121c. The third colored layer 110c-1 and the third transparent resin layer 110c-2 in the third section 121c form the third color filter 110c.

Referring to FIG. 2, the planarization layer 130 and/or the focusing lens 140 are sequentially formed on the first, second, and third color filters 110a, 110b, and 110c of the first, second, and third sections 121a, 121b, and 121c, manufacturing the color filter array 100.

A method of manufacturing the color filter array 100 according to some example embodiments may increase a content of a colorant such as a dye and/or a pigment in the coloring composition by respectively preparing a coloring composition for the colored layer 110-1 and a transparent composition for the transparent resin layer 110-2 and then, forming the colored layer 110-1 and the transparent resin layer 110-2 as separate layers and accordingly, increase the content of the colorant in the colored layer 110-1 at the same thickness or form a thinner color filter with the same content of the colorant in the colored layer 110-1, compared with a conventional color filter obtained by curing a composition including a colorant, a binder, a dispersant, a reaction initiator, and a crosslinkable monomer.

Hereinafter, another example of a color filter array according to some example embodiments is described.

FIG. 13 is a cross-sectional view showing another example of the unit group of the color filter array of FIG. 1.

A color filter array 100 according to some example embodiments, like the color filter array 100 according to some example embodiments, including the example embodiments shown in any of FIGS. 1 to 12, includes the partition wall 120 including the lower surface 120p and the sidewall 121q, the color filter 110 including first, second, and third color filters 110a, 110b, and 110c, the planarization layer 130, and the focusing lens 140. Each of the first, second, and third color filters 110a, 110b, and 110c may be positioned in each first, second, and third section 121a, 121b, and 121c partitioned by the partition wall 120 and have a stacked structure of the colored layer 110-1 and the transparent resin layer 110-2. In other words, the first color filter 110a includes a stacked structure of the first colored layer 110a-1 and the first transparent resin layer 110a-2 isolated in the first section 121a, the second color filter 110b includes a stacked structure of the second colored layer 110b-1 and the second transparent resin layer 110b-2 isolated in the second section 121b, and the third color filter 110c includes a stacked structure of the third colored layer 110c-1 and the third transparent resin layer 110c-2 isolated in the third section 121c.

However, the color filter array 100 according to some example embodiments, unlike some example embodiments, including the example embodiments shown in any of FIGS. 1 to 12, further includes a hardmask layer 150. The hardmask layer 150 may be disposed on the transparent resin layer 110-2 of the color filter 110 and separately disposed in the plurality of sections 121 partitioned by the partition wall 120. For example, the hardmask layer 150 includes a first hardmask layer 150a on the first transparent resin layer 110a-2 in the first section 121a, a second hardmask layer 150b on the second transparent resin layer 110b-2 in the second section 121b, and a third hardmask layer 150c on the third transparent resin layer 110c-2 in the third section 121c.

The hardmask layer 150 may help a sub-micrometer color filter 110 be formed through a positive photoresist film and a dry-etching using the positive photoresist film. This will be described later. The first, second, and third hardmask layers 150a, 150b, and 150c may have a substantially equivalent planar shape to that of each first, second, and third transparent resin layers 110a-2, 110b-2, and 110c-2, but is not limited thereto.

The hardmask layer 150 may be a transparent hardmask layer having a high light transmittance for a visible light wavelength spectrum and may have for example an average light transmittance of about 90% to about 100%, or within the above range, about 92% to about 100%, about 94% to about 100%, about 95% to about 100%, about 97% to about 100%, about 98% to about 100%, or about 99% to about 100% in a wavelength spectrum of about 400 nm to about 700 nm.

The hardmask layer 150 may include, for example, an organic material, an inorganic material, an organic-inorganic material, or any combination thereof, for example, an organic material, an inorganic material, an organic-inorganic material, or any combination thereof which has high etch-resistance for gas used during the dry-etching. For example, an etch rate of the hardmask layer 150 for fluorine-containing gas (e.g., $CF_4$, $CHF_3$, $C_3F_8$, $C_4F_8$, or any combination thereof) may be lower than those of the colored layer 110-1 and the transparent resin layer 110-2, for example, the each rate of the hardmask layer 150 for fluorine-containing gas may be about 2 times or more, about 3 times or more, or about 5 times or more lower than those of the colored layer 110-1 and the transparent resin layer 110-2, or within the above range, about 2 times to about 10 times, about 3 times to about 10 times, or about 5 times to about 10 times lower than those of the colored layer 110-1 and the transparent resin layer 110-2. For example, the each rate of the hardmask layer 150 for the fluorine-containing gas (e.g., $CF_4$, $CHF_3$, $C_3F_8$, $C_4F_8$, or any combination thereof) may be less than or equal to about 100 nm/min, or within the above range, about 10 nm/min to about 100 nm/min, about 10 nm/min to about 80 nm/min, about 10 nm/min to about 70 nm/min, about 10 nm/min to about 50 nm/min, or about 10 nm/min to about 30 nm/min.

The hardmask layer 150 may include an oxide, a nitride, an oxynitride, or any combination thereof which has this etch resistance, for example, indium zinc oxide (IZO), silicon nitride, silicon oxide, silicon oxynitride, aluminum oxide, hafnium oxide, or any combination thereof, but is not limited thereto.

The hardmask layer 150 may have a thickness of less than or equal to about 300 nm and within the above range, for example, about 10 nm to about 300 nm, about 10 nm to about 250 nm, about 10 nm to about 200 nm, about 10 nm to about 150 nm, or about 10 nm to about 100 nm.

Incident light flows into the focusing lens 140, the planarization layer 130, the hardmask layer 150, the transparent resin layer 110-2, the colored layer 110-1, and the partition wall 120, wherein a refractive index of each layer may gradually decrease along a path of the light. In other words, a refractive index of the focusing lens 140 may be higher than that of the planarization layer 130, the refractive index of the planarization layer 130 may be higher than that of the hardmask layer 150, the refractive index of the hardmask layer 150 may be higher than that of the transparent resin layer 110-2, the refractive index of transparent resin layer 110-2 may be higher than that of the colored layer 110-1, and the refractive index of the colored layer 110-1 may be higher than that of the partition wall 120. Accordingly, a refractive index of each layer may be controlled to reduce or prevent reflection and/or absorption of the light but achieve substantially total reflection so that the light may effectively reach the colored layer 110-1 and a lower portion thereof.

Since the color filter array 100 according to some example embodiments includes the hardmask layer 150 on the color filter 110, a positive photoresist film and a dry-etching process using the same may be performed, resultantly forming a sub-micrometer color filter 110.

Hereinafter, a method of manufacturing the aforementioned color filter array 100 is described.

FIGS. 14, 15, 16, 17, 18, 19, 20, 21, 22, 23, 24, 25, 26, 27, 28, 29, 30, and 31 are cross-sectional views sequentially illustrating an example of a method of manufacturing the color filter array shown in FIG. 13.

A method of manufacturing a color filter array 100 according to some example embodiments includes forming a partition wall 120 partitioning a plurality of sections 121 including the first, second, and third sections 121a, 121b, and 121c, forming a first color filter 110a configured to selectively transmit light of a first wavelength spectrum belonging to a visible light wavelength spectrum in the first section 121a, forming a first hardmask layer 150a on the first color filter 110a, forming a second color filter 110b configured to selectively transmit light of a second wavelength spectrum belonging to the visible light wavelength spectrum in the second section 121b, forming a second hardmask layer 150b on the second color filter 110b, forming a third color filter 110c configured to selectively transmit light of a third wavelength spectrum belonging to a visible light wavelength spectrum in the third section 121c; and forming a third hardmask layer 150c on the third color filter 110c.

First, as in an example of the aforementioned manufacturing method, the partition wall 120 is formed (FIG. 3).

Next, a first color filter 110a is formed in the first section 121a.

The forming of the first color filter 110a includes forming a first colored layer 110a-1, forming a first transparent resin layer 110a-2 on the first colored layer 110a-1; applying and patterning a positive photoresist film 40 to expose the first transparent resin layer 110a-2 of the first section 121a, depositing a hardmask layer 150 on the positive photoresist film 40 and the first transparent resin layer 110a-2, and removing the hardmask layer 150 and the positive photoresist film 40 to form a first hardmask layer 150a on the first transparent resin layer 110a-2 of the first section 121a, and dry-etching using the first hardmask layer 150a as a mask to remove all the first colored layers 110a-1 and the first transparent resin layers 110a-2 existing in the other sections except the first colored layer 110a-1, the first transparent resin layer 110a-2, and the first hardmask layer 150a of the first section 121a.

As an example of the aforementioned manufacturing method, the first coloring composition 110a-1C for the first colored layer 110a-1 is applied on the partition wall 120 (FIG. 4). The first coloring composition 110a-1C is the same as described above.

Next, the applied first coloring composition 110a-1C is annealed. The annealing may be performed, for example, at about 50° C. to about 120° C. for about 5 minutes to about 10 hours, wherein the solvent is removed from the applied first colored composition 110a-1C by the annealing, and the first colored layer 110a-1 may be formed in all sections 121 including the first, second, and third sections 121a, 121b, and 121c.

Next, referring to FIG. 14, the transparent composition 110a-2C for a transparent resin layer is applied on the first colored layer 110a-1. The transparent composition 110a-2C is the same as described above.

The applying of the transparent composition 110a-2C may be performed by, for example, a solution process such as spin coating, slit coating, inkjet coating, or dip coating, but is not limited thereto. The transparent composition 110a-2C may be applied on the partition wall 120 and on the first colored layer 110a-1 in all the sections 121 including the first, second, and third sections 121a, 121b, and 121c of the partition wall 120.

Referring to FIG. 15, the applied transparent composition 110a-2C is cured to form the first transparent resin layer 110a-2. The curing may be thermal curing and/or photo-curing. The thermal curing may be performed by annealing, and the annealing may be performed, for example, at about 50° C. to about 120° C. for about 5 minutes to about 10 hours. The solvent may be removed from the applied transparent composition 110a-2C by annealing, and the crosslinkable monomer may be crosslinked and cured by a thermal initiator. The photo-curing may be performed by irradiating light such as UV to the applied transparent composition 110a-2C to crosslink the crosslinkable monomer by a photoinitiator and to cure it. The solvent may be removed from the applied transparent compositions 110a-2C by additional annealing.

Subsequently, referring to FIG. 16, a positive photoresist film 40 is applied to the whole surface of a substrate and patterned to expose the first transparent resin layer 110a-2 of the first section 121a to light.

Then, referring to FIG. 17, on the positive photoresist film 40 and the first transparent resin layer 110a-2 of the first section 121a, the hardmask layer 150 is formed. The hardmask layer 150 may be formed by using, for example an organic material, an inorganic material, an organic-inorganic material, or any combination thereof through a sputtering, deposition, or solution process, for example, by sputtering or depositing IZO, silicon nitride, silicon oxide, silicon oxynitride, aluminum oxide, hafnium oxide, or any combination thereof.

Next, referring to FIG. 18, the positive photoresist film 40 is lifted off to remove the positive photoresist film 40 and the hardmask layer 150 on the positive photoresist film 40 and to selectively form a first hardmask layer 150a on the first transparent resin layer 110a-2 in the first section 121a.

Subsequently, referring to FIG. 19, the first hardmask layer 150a as a mask used to dry-etch and remove the first colored layer 110a-1 and the first transparent resin layer 110a-2 other than the first section 121a. Accordingly, in the first section 121a of the partition wall 120, the first color filter 110a including the first colored layer 110a-1 and the first transparent resin layer 110a-2 and the first hardmask layer 150a on the first color filter 110a are formed.

Then, the second color filter 110b is formed in the second section 121b.

In the second section 121b, the forming of the second color filter 110b may be performed through the same process as the above formation of the first color filter 110a.

For example, the forming of the second color filter 110b includes forming a second colored layer 110b-1, forming a second transparent resin layer 110b-2 on the second colored layer 110b-1, forming a second hardmask layer 150b; and dry-etching using the second hardmask layer 150b as a mask to remove all of the second colored layer 110b-1 and the second transparent resin layer 110b-2 other than for the second section 121b, and to form a second color filter 110b including the second colored layer 110b-1 and the second transparent resin layer 110b-2 in the second section 121b, and a second hardmask layer 150b on the second color filter 110b.

Referring to FIG. 20, the second coloring composition 110b-1C for the second colored layer 110b-1 is applied on the partition wall 120. The second coloring composition 110b-1C is the same as described above.

The second coloring composition 110b-1C may be applied by, for example, a solution process such as spin coating, slit coating, inkjet coating, or dip coating, but is not limited thereto. The second coloring composition 110b-1C may be filled on the partition wall 120 and in all the sections 121 including the first, second, and third sections 121a, 121b, and 121c of the partition wall 120.

The applied second coloring composition 110b-1C is then annealed. The annealing may be performed, for example, at about 50° C. to about 120° C. for about 5 minutes to about 10 hours, wherein the solvent is removed from the applied second coloring composition 110b-1C by the annealing, and the second colored layer 110b-1 may be formed in all sections 121 including the first, second, and third sections 121a, 121b, and 121c.

Referring to FIG. 21, the transparent composition 110b-2C for a transparent resin layer is applied to the whole surface including the second colored layer 110b-1. The transparent composition 110b-2C may be a thermosetting composition and/or a photocurable composition, and may include a reaction initiator, a crosslinkable monomer, an additive, and a solvent. The reaction initiator, the crosslinkable monomer, the additive, and the solvent are the same as described above.

The applying of the transparent composition 110b-2C may be performed by, for example, a solution process such as spin coating, slit coating, inkjet coating, or dip coating, but is not limited thereto. The transparent composition 110b-2C may be applied on the partition wall 120 and on the second colored layer 110b-1 in all the sections 121 including the first, second, and third sections 121a, 121b, and 121c of the partition wall 120.

Referring to FIG. 22, the applied transparent composition 110b-2C is cured to form the second transparent resin layer 110b-2. The curing may be thermal curing and/or photo-curing. The thermal curing may be performed by annealing, and the annealing may be performed, for example, at about 50° C. to about 120° C. for about 5 minutes to about 10 hours. The solvent may be removed from the applied transparent composition 110b-2C by annealing, and the crosslinkable monomer may be crosslinked and cured by a thermal initiator. The photo-curing may be performed by irradiating light such as UV to the applied transparent composition 110b-2C to crosslink the crosslinkable monomer by a photoinitiator and to cure it. The solvent may be removed from the applied transparent compositions 110b-2C by additional annealing.

Next, the positive photoresist film 40 is applied to the whole surface of the substrate and patterned by a photolithography process to expose the second transparent resin layer 110b-2 of the second section 121b.

Referring to FIG. 23, the hardmask layer 150 is formed on the positive photoresist film 40 and the second transparent resin layer 110b-2 of the second section 121b.

Next, referring to FIG. 24, the positive photoresist film 40 is lifted off to remove the positive photoresist film 40 and the hardmask layer 150 on the positive photoresist film 40 and to selectively form a second hardmask layer 150b on the second transparent resin layer 110b-2 in the second section 121b.

Subsequently, referring to FIG. 25, a second hardmask layer 50b as a mask is used for dry-etching to remove the second colored layer 110b-1 and the second transparent resin layer 110b-2 other than the second section 121b. Accordingly, the second color filter 110b including the second colored layer 110b-1 and the second transparent resin layer 110b-2 in the second section 121b of the partition wall 120 and the second hardmask layer 50b disposed on the second color filter 110b are formed.

Subsequently, the third color filter 110c is formed in the third section 121c.

The forming of the third color filter 110c in the third section 121c may be performed through the same process of forming the above first color filter 110a and the second color filter 110b.

For example, the forming of the third color filter 110c includes forming the third colored layer 110c-1, forming the third transparent resin layer 110c-2 on the third colored layer 110c-1, forming the third hardmask layer 150c; and dry-etching and removing the third colored layer 110c-1 and the third transparent resin layer 110c-2 other than the third section 121c by using the third hardmask layer 150c as a mask; and forming the third color filter 110c including the third colored layer 110c-1 and the third transparent resin layer 110c-2 in the third section 121c and the third hardmask layer 150c on the third color filter 110c.

Referring to FIG. 26, the third coloring composition 110c-1C for the third colored layer 110c-1 is applied on the partition wall 120. The third coloring composition 110c-1C is the same as described above.

The third coloring composition 110c-1C may be applied by, for example, a solution process such as spin coating, slit coating, inkjet coating, or dip coating, but is not limited thereto. The third coloring composition 110c-1C may be filled on the partition wall 120 and in all the sections 121 including the first, second, and third sections 121a, 121b, and 121c of the partition wall 120.

The applied third coloring composition 110c-1C is then annealed. The annealing may be performed, for example, at about 50° C. to about 120° C. for about 5 minutes to about 10 hours, wherein the solvent is removed from the applied third coloring composition 110c-1C by the annealing, and the third colored layer 110c-1 may be formed in all sections 121 including the first, second, and third sections 121a, 121b, and 121c.

Referring to FIG. 27, a transparent composition 110c-20 for a transparent resin layer is applied on the third colored layer 110c-1. The transparent composition 110c-20 may be a thermosetting composition and/or a photocurable composition, and may include a reaction initiator, a crosslinkable monomer, an additive, and a solvent. The reaction initiator, the crosslinkable monomer, the additive, and the solvent are the same as described above.

The applying of the transparent composition 110c-20 may be performed by, for example, a solution process such as spin coating, slit coating, inkjet coating, or dip coating, but is not limited thereto. The transparent composition 110c-20 may be applied on the partition wall 120 and on the third colored layer 110c-1 in all the sections 121 including the first, second, and third sections 121a, 121b, and 121c of the partition wall 120.

Referring to FIG. 28, the applied transparent composition 110c-20 is cured to form the third transparent resin layer 110c-2. The curing may be thermal curing and/or photo-curing. The thermal curing may be performed by annealing, and the annealing may be performed, for example, at about 50° C. to about 120° C. for about 5 minutes to about 10 hours. The solvent may be removed from the applied transparent composition 110c-20 by annealing, and the crosslinkable monomer may be crosslinked and cured by a thermal initiator. The photo-curing may be performed by irradiating light such as UV to the applied transparent composition 110c-20 to crosslink the crosslinkable monomer by a photoinitiator and to cure it. The solvent may be removed from the applied transparent compositions 110c-20 by additional annealing.

Next, the positive photoresist film 40 is applied to the whole surface of the substrate and patterned to expose the third transparent resin layer 110c-2 of the third section 121c.

Next, referring to FIG. 29, a hardmask layer 150 is formed on the positive photoresist film 40 and the third transparent resin layer 110c-2 of the third section 121c.

Next, referring to FIG. 30, the positive photoresist film 40 is lifted off to remove the positive photoresist film 40 and the hardmask layer 150 on the positive photoresist film 40 and to selectively form a third hardmask layer 150c on the third transparent resin layer 110c-2 in the third section 121c.

Subsequently, referring to FIG. 31, the third hardmask layer 150c as a mask is used to dry-etch the third colored layer 110c-1 and the third transparent resin layer 110c-2 other than the third section 121c. Accordingly, the third color filter 110c including the third colored layer 110c-1 and the third transparent resin layer 110c-2 in in the third section 121c of the partition wall 120 and the third hardmask layer 150c on the third color filter 110c are formed.

Referring to FIG. 13, the planarization layer 130 and/or the focusing lens 140 are sequentially selectively formed on each first, second, and third hardmask layer 150a, 150b, and 150c of the first, second, and third section 121a, 121b, and 121c, manufacturing the color filter array 100.

In this way, a method of manufacturing the color filter array 100 according to some example embodiments may increase a content of a colorant such as a dye and/or a pigment in a coloring composition by respectively preparing a coloring composition for the colored layer 110-1 and a transparent composition for the transparent resin layer 110-2 and forming the colored layer 110-1 and the transparent resin layer 110-2 as separate layers and accordingly, compared with a conventional color filter obtained by curing a composition including a colorant, a binder, a dispersant, a reaction initiator, and a crosslinkable monomer, may increase a content of the colorant at the same thickness or obtain a much thinner color filter with the same content of the colorant.

In addition, the method of manufacturing the color filter array 100 according to some example embodiments includes a patterning process using the positive photoresist film 40 and a dry-etching process using the hardmask layer 150 and thus may effectively form a fine pattern which is difficult to form through negative photolithography alone and effectively realize, for example, the sub-micrometer color filters 110a, 110b, and 110c of less than about 1 μm, less than or equal to about 800 nm, or less than or equal to about 500 nm.

The above color filter array 100 may be applied to various electronic devices requiring wavelength separation. For example, the above color filter array 100 may be applied to an image sensor. The image sensor may obtain a particular (or, alternatively, predetermined) image by decomposing incident light for each wavelength by the color filter array 100 and converting optical signals according to each wavelength spectrum into electrical signals. The image sensor may be, for example, a CMOS image sensor.

FIG. 32 is a perspective view showing an example of an image sensor according to some example embodiments, and FIG. 33 is a cross-sectional view showing an example of a unit pixel group of the image sensor of FIG. 32.

An image sensor 300 includes a plurality of pixels, and the plurality of pixels includes first, second, and third pixels 300a, 300b, and 300c for selectively sensing light of first, second, and third wavelength spectra belonging to a visible light wavelength spectrum. The first, second, and third wavelength spectra are different one another and may be selected from for example, a green wavelength spectrum, a red wavelength spectrum, a blue wavelength spectrum, or any combination thereof, wherein the green wavelength spectrum may be, for example, about 500 nm to about 600 nm, the red wavelength spectrum may be greater than about 600 nm and less than about 750 nm, and the blue wavelength spectrum may be greater than or equal to about 380 nm and less than about 500 nm.

The first, second, and third pixels 300a, 300b, and 300c may respectively be, for example, a green pixel for sensing light of the green wavelength spectrum, a red pixel for sensing light of the red wavelength spectrum, and a blue pixel for sensing light of a blue wavelength spectrum. At least one first pixel 300a (e.g., green pixel), at least one second pixel 300b (e.g., red pixel), and at least one third pixel 300c (e.g., blue pixel) form one pixel group PG and may be repeatedly arranged along rows and/or columns. Each pixel group PG may include, for example, two first pixels 300a (e.g., two green pixels), one second pixel 300b (e.g., one red pixel), and one third pixel 300c (e.g., one blue pixel), but is not limited thereto.

Referring to FIGS. 32 and 33, the image sensor 300 according to some example embodiments includes a substrate 310, a color filter array 100, and a photo sensing device 200.

The substrate 310 may be a semiconductor substrate, for example, a silicon substrate. The substrate 310 may be, for example, a CMOS substrate and may include a CMOS circuit unit. CMOS circuit unit may include a transmission transistor and/or a charge storage.

A metal wire (not shown) and a pad (not shown) may be formed on or under the substrate 310. In order to decrease signal delay, the metal wire and pad may be made of a metal having low resistivity, for example, aluminum (Al), copper (Cu), silver (Ag), and alloys thereof, but is not limited thereto.

The color filter array 100 is the same as described above. The color filter array 100 may be on the whole surface of the substrate 310 and as described above, include a plurality of color filters 110 including the first, second, and third color filters 110a, 110b, and 110c. Each pixel may correspond to each above section 121, and each color filter 110 may be included in each pixel. In other words, the first, second, and third pixels 300a, 300b, and 300c may each correspond to the first, second, and third sections 121a, 121b, and 121c and respectively include the first, second, and third color filters 110a, 110b, and 110c. Even though in the drawing, the color filter array 100 shown in FIG. 2 is drawn, the present inventive concepts are not limited thereto, and the color filter array 100 shown in FIG. 13 may be applied.

The photo-sensing device 200 may be integrated in the substrate 310 and may be overlapped with each color filter 110 of the color filter array 100 along the thickness direction of the substrate 310. The photo-sensing device 200 may be, for example, a silicon photo-sensing device, for example, a silicon photodiode.

The photo-sensing device 200 may include first, second, and third photo-sensing devices 200a, 200b, and 200c overlapped with the first, second, and third color filters 110a, 110b, and 110c, respectively. Each of the first, second, and third photo-sensing devices 200a, 200b, and 200c may be configured to absorb light transmitted through the first, second, and third color filters 110a, 110b, and 110c, respectively, and convert the absorbed light into an electrical signal. For example, when the first, second, and third color filters 110a, 110b, and 110c are a green filter, a red filter, and a blue filter, respectively, the first photo-sensing device 200a overlapped with the first color filter 110a may be configured to sense light of a green wavelength spectrum and convert it into an electrical signal, the second photo-sensing device 200b overlapped with the second color filter 110b may be configured to sense light of a red wavelength spectrum and convert it into an electrical signal, and the third photo-sensing device 200c overlapped with the third color filter 110c may be configured to sense light of a blue wavelength spectrum and convert it into an electrical signal. Accordingly, a particular (or, alternatively, predetermined) image may be obtained by combining the electrical signals obtained from the first, second, and third photo-sensing devices 200a, 200b, and 200c.

An anti-reflection layer (not shown) may be between the color filter array 100 and the photo-sensing device 200. The anti-reflection layer may reduce or prevent reflection of light flowing into the photo-sensing device 200, thereby reducing loss of light flowing into the photo-sensing device 200. The anti-reflection layer may include, for example, one or two or more inorganic films, and for example, may have a stacked structure of inorganic films having different refractive indices, or for example, may have a stacked structure of different inorganic films selected from a metal oxide film, a metal nitride film, a metal oxynitride film, a semi-metal oxide film, a semi-metal nitride film, and a semi-metal oxynitride film. The anti-reflection layer may be omitted.

FIG. 34 is a cross-sectional view showing another example of a unit pixel group of the image sensor of FIG. 32.

Referring to FIG. 34, an image sensor 300 according to some example embodiments includes a substrate 310, a color filter array 100, and a photo-sensing device 200, as in the aforementioned example. However, in the image sensor 300 according to some example embodiments, the photo-sensing device 200 is disposed on the substrate 310 unlike the aforementioned example.

The substrate 310 may be a semiconductor substrate, for example, a silicon substrate. The substrate 310 may be, for example, a CMOS substrate and may include a CMOS circuit unit. The substrate 310 may include charge storages 260a, 260b, and 260c and a transmission transistor (not shown). The charge storages 260a, 260b, and 260c are electrically connected to a photo-sensing device 200 to be described later. A metal wire (not shown) and a pad (not shown) may be formed on the lower portion or upper portion of the substrate 310.

The color filter array 100 is the same as described above. Even though in the drawing, the color filter array 100 shown in FIG. 2 is drawn, the present inventive concepts are not limited thereto, and the color filter array 100 shown in FIG. 13 may be applied.

The photo-sensing device 200 may be between the substrate 310 and the color filter array 100, and may be configured to sense light passing through the color filter array 100 and convert it into an electrical signal. The photo-sensing device 200 may be a photoelectric conversion diode, and may include a first photo-sensing device 200a overlapped with the first color filter 110a, a second photo-sensing device 200b overlapped with the second color filter 110b, and a third photo-sensing device 200c overlapped with the third color filter 110c.

The first photo-sensing device 200a, the second photo-sensing device 200b, and the third photo-sensing device 200c include each of lower electrodes 210a, 210b, and 210c, upper electrode 220, photoelectric conversion layer 230, and charge auxiliary layers 240 and 250.

One of the lower electrodes 210a, 210b, and 210c or the upper electrode 220 is an anode and the other is a cathode. For example, the lower electrodes 210a, 210b, and 210c may be an anode and the upper electrode 220 may be a cathode. For example, the lower electrodes 210a, 210b, and 210c may be a cathode and the upper electrode 220 may be an anode.

At least one of the lower electrodes 210a, 210b, and 210c or the upper electrode 220 may be a light-transmitting electrode, and for example, the lower electrodes 210a, 210b, 210c and the upper electrode 220 may each be a light-transmitting electrode. The light-transmitting electrode may be a transparent electrode or a semi-transmissive electrode. The transparent electrode may have a light transmittance of greater than or equal to about 80%, greater than or equal to about 85%, greater than or equal to about 88%, greater than or equal to about 90%, or greater than or equal to about 95% and the semi-transmissive electrode may have a light transmittance of about 10% to about 70%, about 20% to about 60%, or about 30% to about 50%. The transparent electrode or the semi-transmissive electrode may include, for example, at least one of an oxide conductor, a carbon conductor, or a metal thin film. The oxide conductors may include, for example, one or more selected from indium tin oxide (ITO), indium zinc oxide (IZO), zinc tin oxide (ZTO), aluminum tin oxide (ATO), and aluminum zinc oxide (AZO), the carbon conductor may include one or more selected from graphene and carbon nanostructures, and the metal thin film may be a very thin film including aluminum (Al), magnesium (Mg), silver (Ag), gold (Au), an alloy thereof, or any combination thereof.

The lower electrodes 210a, 210b, and 210c may be pixel electrodes separated for each of the first, second, and third pixels 300a, 300b, and 300c, respectively, and the upper electrode 220 may be a common electrode. The lower electrodes 210a, 210b, and 210c may be electrically connected to the charge storages 260a, 260b, and 260c integrated in the substrate 310 through the trench 65 of the insulation layer 60, respectively, the trench 65 may be filled with, for example, a conductive filler.

The upper electrode 220 may be an incident electrode disposed in a direction in which light is incident.

The photoelectric conversion layer 230 may include a photoelectric conversion material capable of generating electric charge by absorbing light, for example, an organic light absorbing material, an inorganic light absorbing material, an organic-inorganic light absorbing material, a perovskite structure material (hereinafter referred to as "perovskite") or any combination thereof. The organic light absorbing material, the inorganic light absorbing material, the organic-inorganic light absorbing material, and/or perovskite may be configured to absorb light in a visible light wavelength spectrum, for example, light in a wavelength spectrum of about 400 nm to about 700 nm. One or two or more types of the organic light absorbing material, the inorganic light absorbing material, the organic-inorganic light absorbing material and/or perovskite may be included.

For example, the photoelectric conversion layer 230 may include perovskite. The perovskite may be an inorganic or organic-inorganic light absorbing material having a particular (or, alternatively, predetermined) crystal structure, and may have, for example, a crystal structure represented by $ABX_3$, $A_2BX_4$, $A_3BX_5$, $A_4BX_6$, $ABX_4$, $A_{n-1}B_nX_{3n+1}$, or $L_2A_{n-1}B_nX_{3n+1}$ (n=2-6), but is not limited thereto. Herein A may be, for example, a monovalent metal cation belonging to Group IA (Li, Na, K, Rb, Cs, or Fr); a monovalent organic cation such as organic ammonium cations and an organic amino cation; or any combination thereof, B may be, for example, a metal cation belonging to Groups IVA, IIA, IIIA or VA ($Pb^{2+}$, $Sn^{2+}$, $Ge^{2+}$, $Ga^{2+}$, $Sr^{2+}$, $Ba^{2+}$, $Ga^{2+}$, $In^{2+}$, $Al^{2+}$, $As^{2+}$, $Sb^{2+}$, $Bi^{2+}$, and $Po^{2+}$), X may be an oxygen ion or a halide anion such as $F^-$, $Cl^-$, $Br^-$, or $I^-$, and L may be an aliphatic or aromatic ammonium cation or an aliphatic or aromatic amino cation different from A. The organic ammonium cation or the organic amino cation may be, for example, methylammonium, formamidinium, or phenylammonium, but is not limited thereto. The aliphatic or aromatic ammonium cation or the aliphatic or aromatic amino cation may be, for example, n-butyl ammonium, 2-phenylmethylammonium, or 2-phenylethylammonium, but is not limited thereto.

The perovskite may be for example a halide perovskite including a halide anion. For example, the perovskite may be an organic-inorganic hybrid perovskite including an organic cation and a metal cation. For example, the perovskite may be $CsPbBrI_2$, $CsPbBr_2I$, $CsPbCl_3$, $CsPbBr_3$, $CsPbI_3$, $CH_3NH_3PbCl_3$, $CH_3NH_3PbBr_3$, $CH_3NH_3PbI_3$, $CH_3NH_3Pb(I_xBr_y)_3$ (0<x<1, 0<y<1, x+y=$_1$), $CH_3NH_3Pb(I_xCl_y)_3$ (0<x<1, 0<y<$_1$, x+y=$_1$), $CH_3NH_3Pb(Br_xCl_y)_3$ (0<x<1, 0<y<$_1$, x+y=$_1$), $CH_3NH_3Sn_{1-x}Pb_xBr_3$, $CH_3NH_3Sn_{1-x}Pb_xI_3$, $HC(NH_2)_2PbI_3$, $(C_4H_9NH_3)_2PbBr_4$, $(C_6H_5CH_2NH_3)_2PbBr_4$, $(C_6H_5CH_2NH_3)_2PbI_4$, $(C_6H_5C_2H_4NH_3)_2PbBr_4$, $(C_6H_{13}NH_3)_2(CH_3NH_3)_{n1}Pb_nI_{3n+1}$, or any combination thereof, but is not limited thereto.

The absorption spectrum of the perovskite may have a relatively high absorbance over the full wavelength spectrum of visible light from a short wavelength (e.g., a wavelength belonging to the X-ray or UV-ray region). The absorption characteristics of perovskite may be represented by the cutoff wavelength of the absorption spectrum, and the cutoff wavelength of the absorption spectrum may be an end of the absorption spectrum, that is, the long-wavelength end-point of the wavelength spectrum that the perovskite may be configured to absorb. The cutoff wavelength of the absorption spectrum of the perovskite may be determined by an energy bandgap of the perovskite, and the perovskite may have an energy bandgap that matches the visible light wavelength spectrum. For example, the energy bandgap of the perovskite may be about 1.8 eV to about 4.1 eV, within the above range, about 1.9 eV to about 4.0 eV, or about 2.0 eV to about 3.9 eV.

For example, the absorption spectrum of the perovskite may include all of the visible light wavelength spectrum, the cutoff wavelength of the perovskite may exist at the end-point of the visible light wavelength spectrum or at a longer wavelength, and for example it may belong to a wavelength spectrum of about 700 nm to about 3000 nm.

The photoelectric conversion layers 230 in the first photo-sensing device 200a, the second photo-sensing device 200b, and the third photo-sensing device 200c may be configured to absorb the light passing through the first, second, and third color filters 110a, 110b, and 110c, in each pixel 300a, 300b, and 300c. For example, the photoelectric conversion layer 230 of the first photo-sensing device 200a may be configured to absorb light passing through the first color filter 110a, the photoelectric conversion layer 230 of the second photo-sensing device 200b may be configured to absorb light passing through the second color filter 110b, and the photoelectric conversion layer 230 of the third photo-sensing device 200c may be configured to absorb light passing through the third color filter 110c. Charge carriers (holes or electrons) generated by photoelectric conversion in the photoelectric conversion layers 230 of the first, second, and third photo-sensing devices 200a, 200b, and 200c may move into the lower electrodes 210a, 210b, and 210c and the upper electrode 220, respectively, and charge carriers moved into the lower electrodes 210a, 210b, and 210c may be collected in the charge storages 260a, 260b, and 260c. Accordingly, a particular (or, alternatively, predetermined) image may be obtained by combining the electrical signals obtained from the first, first, and third photo-sensing devices 200a, 200b, and 200c.

The charge auxiliary layers 240 and 250 may be respectively between the lower electrodes 210a, 210b, 210c and the photoelectric conversion layer 230 and between the upper electrode 220 and the photoelectric conversion layer 230. The charge auxiliary layers 240 and 250 may improve the electrical properties between the lower electrodes 210a, 210b, and 210c and the photoelectric conversion layer 230 and between the upper electrode 220 and the photoelectric conversion layer 230, and for example, may increase the photoelectric conversion efficiency or may lower the dark current and/or remaining charge carriers. The charge auxiliary layers 240 and 250 may be, for example, a hole transport layer, a hole injection layer, an electron blocking layer, an electron transport layer, an electron injection layer, a hole blocking layer, or any combination thereof. At least one of the charge auxiliary layers 240 or 250 may be omitted.

In some example embodiments, the photoelectric conversion layer 230 may include one or more dopants to configure the photoelectric conversion layer 230 to absorb and photoelectrically convert light of one particular wavelength spectrum that a limited portion of the visible wavelength spectrum (e.g., red, green, or blue light) while allowing other visible wavelength spectra to pass through the photoelectric conversion layer 230 without being absorbed.

Hereinafter, an image sensor according to another example according to some example embodiments is described.

FIG. 35 is a perspective view showing another example of an image sensor according to some example embodiments, and FIG. 36 is a cross-sectional view showing an example of a unit pixel group of the image sensor of FIG. 35.

Referring to FIG. 35, the image sensor 300 according to some example embodiments includes a visible light sensor Vis PD and an infrared light sensor IR PD. The visible light sensor Vis PD may be on the infrared light sensor IR PD, and the visible light sensor Vis PD may be closer to a side to which light is incident than the infrared light sensor IR PD. Accordingly, incident light may pass through the visible light sensor Vis PD and may be introduced into the infrared light sensor IR PD. The visible light sensor Vis PD and the infrared light sensor IR PD are stacked along the incident direction of the light. The visible light sensor Vis PD and the infrared light sensor IR PD may be configured to selectively sense light of different wavelength spectrums. The visible light sensor Vis PD may include a visible light sensing device 200-1 for sensing light of a visible light wavelength spectrum and the infrared light sensor IR PD may include an infrared light sensing device 200-2 for sensing light of an infrared light wavelength spectrum. Each pixel includes a visible light sensing device 200-1 and an infrared light sensing device 200-2 that are stacked.

Referring to FIG. 36, the image sensor 300 includes a substrate 310, a color filter array 100, a visible light sensing device 200-1, and an infrared light sensing device 200-2.

The substrate 310 may be a semiconductor substrate, for example, a silicon substrate. The substrate 310 may be, for example, a CMOS substrate and may include a CMOS circuit unit. The substrate 310 may include charge storages 260a, 260b, and 260c and a transmission transistor (not shown). The charge storages 260a, 260b, and 260c are electrically connected to a visible light sensing device 200-1, which will be described later. A metal wire (not shown) and a pad (not shown) may be formed on or under the substrate 310.

The color filter array 100 is the same as described above. The color filter array 100 is disposed on the whole surface of the substrate 310 and as described above, includes a plurality of the color filters 110 including first, second, and third color filters 110a, 110b, and 110c. Each pixel 300a, 300b, and 300c may correspond to each section 121, and each color filter 110 may be included in each pixel 300a, 300b, and 300c. In other words, the first, second, and third pixels 300a, 300b, and 300c may respectively correspond to each first, second, and third section 121a, 121b, and 121c and respectively include the first, second, and third color filter 110a, 110b, and 110c. Even though in the drawing, the color filter array 100 shown in FIG. 2 is drawn, the present inventive concepts are not limited thereto, and the color filter array 100 shown in FIG. 13 may be applied.

The visible light sensing device 200-1 may be the same as the aforementioned photo-sensing device 200. That is, the visible light sensing device 200-1 may be between the substrate 310 and the color filter array 100, and may be configured to sense light passing through the color filter array 100 and convert it into an electrical signal. The visible light sensing device 200-1 may be a photoelectric conversion diode, and may include a first photo-sensing device 200a overlapped with the first color filter 110a, a second photo-sensing device 200b overlapped with the second color filter 110b, and a third photo-sensing device 200c overlapped with the third color filter 110c. The first photo-sensing device 200a, the second photo-sensing device 200b, and the third photo-sensing device 200c include each of lower electrodes 210a, 210b, and 210c, upper electrodes 220, photoelectric conversion layers 230, and charge auxiliary layers 240 and 250. The detailed description thereof is the same as described above.

The infrared light sensing device 200-2 may be integrated in the substrate 310 and may be, for example, a silicon photodiode. The infrared light sensing device 200-2 may be formed to have a thickness configured to absorb light of an infrared light wavelength spectrum in the substrate 310, for example, in a range of about 1 µm to about 10 µm, and within the above range, about 2 µm to about 8 µm, or about 2 µm to about 6 µm. The infrared light sensing device 200-2 may be configured to sense light passing the color filter array 100 and the visible light sensing device 200-1 and, even though an absorption spectrum of a silicon photodiode ranges from a short wavelength to an infrared light wavelength spectrum, exclude light of a visible light wavelength spectrum but selectively absorb light of an infrared light wavelength spectrum and photoelectrically convert it.

The image sensor 300 according to some example embodiments may be a stacked sensor in which a visible light sensor and an infrared light sensor configured to sense light of different wavelength spectrums are stacked. Accordingly, an in-pixel image sensor that realizes an image by simultaneously sensing light in the visible light region and light in the infrared region within one pixel may be implemented. Therefore, unlike the structure in which the visible light sensor and the infrared light sensor are manufactured on separate substrates, sensitivity in a low-light environment may be improved without increasing the size of the image sensor 300, and by widening a dynamic range that separates black and white details, sensing ability of a 3D image may be effectively increased. In addition, the infrared light sensor may be used as a security sensor, a vehicle sensor, or a biometric sensor, and may be used as a combination sensor having combination functions of an image sensor, a security sensor, a vehicle sensor, or a biometric sensor due to the aforementioned stacked structure of the visible light sensor and the infrared light sensor. Herein, the biometric sensor may be, for example, an iris sensor, a distance sensor, a fingerprint sensor, or a blood vessel distribution sensor, but is not limited thereto.

It will be understood that, in some example embodiments, the infrared light sensing device 200-2 may be replaced with a second visible light sensor 400-2, as described with regard to FIG. 38, which includes photodiodes 400-2a and 400-2c configured to absorb and photoelectrically convert visible light. The photoelectric conversion layer 230 may be configured to selectively absorb and photoelectrically convert a portion of the light selectively transmitted by the color filters 110 of the color filter array 100 and selectively transmit the remainder of the selectively transmitted light to the photodiodes 400-2a and 400-2c to be selectively absorbed and photoelectrically transmitted thereby. In such example embodiments, each color filter 110 may be configured to selectively transmit a mixed light that includes light of one wavelength spectrum that is to be selectively absorbed and photoelectrically converted by the photoelectric conversion layer 230 and light of another wavelength spectrum that is one of a plurality of wavelength spectra, different from the one wavelength spectrum, that is to be selectively absorbed and photoelectrically converted by an underlying photodiode 400-2a or 400-2c. For example, in some example embodiments, the first color filters 110a may be configured to selectively transmit cyan light, the third color filters 110c may be configured to selectively transmit yellow light, and the second color filters 110b may be omitted, the photoelectric conversion layer 230 may be configured to selectively absorb and photoelectrically convert green light (e.g., a portion of the transmitted cyan and yellow light), and the photodiodes 400-2a and 400-2c (see FIG. 38, replacing the infrared image sensor 200-2) may be configured to selectively absorb and photoelectrically convert blue light and red light, respectively.

FIG. 37 is a cross-sectional view showing another example of a unit pixel group of the image sensor of FIG. 35.

The image sensor 300 according to some example embodiments includes a substrate 310, a color filter array 100, a visible light sensing device 200-1, and an infrared light sensing device 200-2 like the image sensor 300 according to the aforementioned example embodiments.

However, unlike the image sensor 300 according to at least some of the aforementioned example embodiments, the image sensor 300 according to some example embodiments may be a photoelectric conversion diode in which the infrared light sensing device 200-2 is disposed on the substrate 310. That is, the infrared light sensing device 200-2 may be on the whole surface of the substrate 310, and may be stacked with the visible light sensing device 200-1 in the first, second, and third pixels 300a, 300b and 300c.

The infrared light sensing device 200-2 includes a lower electrode 270, an upper electrode 280, a photoelectric conversion layer 290 between the lower electrode 270 and the upper electrode 280, and charge auxiliary layers 291 and 292 between the lower electrode 270 and the photoelectric conversion layer 290 and between the upper electrode 280 and the photoelectric conversion layer 290.

One of the lower electrode 270 or the upper electrode 280 may be an anode and the other may be a cathode. For example, the lower electrode 270 may be an anode and the upper electrode 280 may be a cathode. For example, the lower electrode 270 may be a cathode and the upper electrode 280 may be an anode. The lower electrode 270 may be, for example, a light-transmitting electrode or a reflective electrode. The upper electrode 280 may be, for example, a light-transmitting electrode, and the description of the light-transmitting electrode is the same as described above. The lower electrode 270 may be electrically connected to the charge storage 260d integrated in the substrate 310 through the trench 75 of the insulating layer 70. The upper electrode 280 may be an incident electrode disposed in a direction in which light passing through the color filter array 100 and the visible light sensing device 200-1 is incident.

The photoelectric conversion layer 290 may be configured to absorb at least a portion of the infrared light wavelength spectrum to perform photoelectric conversion, and may include, for example, an organic light absorbing material, an inorganic light absorbing material, an organic-inorganic light absorbing material, perovskite, or any combination thereof. The organic light absorbing material, inorganic light absorbing material, organic-inorganic light absorbing material, and/or perovskite included in the photoelectric conversion layer 290 may be different from the organic light absorbing material, the inorganic light absorbing material, the organic-inorganic light absorbing material, and/or perovskite included in the aforementioned photoelectric conversion layer 230.

The perovskite included in the photoelectric conversion layer 290 may be configured to absorb light of at least a portion of the infrared wavelength spectrum, wherein the infrared wavelength spectrum may include some or all of the near-infrared, short-wave infrared, mid-wave infrared, and far-infrared wavelength spectrum, and may be, for example, greater than about 700 nm and less than or equal to about 3000 nm, within the above range, greater than about 700 nm and less than or equal to about 2500 nm, greater than about 700 nm and less than or equal to about 2000 nm, greater than about 700 nm and less than or equal to about 1800 nm, greater than about 700 nm and less than or equal to about 1500 nm, about 750 nm to about 3000 nm, about 750 nm to about 2500 nm, about 750 nm to about 2000 nm, about 750 nm to about 1800 nm, about 750 nm to about 1500 nm, about 800 nm to about 3000 nm, about 800 nm to about 2500 nm, about 800 nm to about 2000 nm, about 800 nm to about 1800 nm, or about 800 nm to about 1500 nm, but is not limited thereto. For example, the absorption spectrum of the perovskite included in the photoelectric conversion layer 290 may have a relatively high absorbance from a short wavelength (e.g., a wavelength belonging to an X-ray or UV-ray region) to an infrared wavelength spectrum. The perovskite included in the photoelectric conversion layer 290 may have an energy bandgap that matches the infrared light wavelength spectrum.

For example, the cutoff wavelength of the absorption spectrum of the perovskite included in the photoelectric conversion layer 290 may be the end-point of the infrared light wavelength spectrum to be photoelectrically converted, and may be a longer wavelength than the cutoff wavelength of the absorption spectrum of the aforementioned perovskite included in the photoelectric conversion layer 230. The cutoff wavelength of the absorption spectrum of the perovskite of the photoelectric conversion layer 290 may belong to, for example, about 800 nm to about 3000 nm, within the above range, about 800 nm to about 2500 nm, about 800 nm to about 2200 nm, about 800 nm to about 2000 nm, about 800 nm to about 1800 nm, about 800 nm to about 1500 nm, about 800 nm to about 1300 nm, about 900 nm to about 2500 nm, about 900 nm to about 2200 nm, about 900 nm to about 2000 nm, about 900 nm to about 1800 nm, about 900 nm to about 1500 nm, about 900 nm to about 1300 nm, about 1000 nm to about 2500 nm, about 1000 nm to about 2200 nm, about 1000 nm to about 2000 nm, about 1000 nm to about 1800 nm, about 1000 nm to about 1500 nm, or about 1000 nm to about 1300 nm. For example, the perovskite included in the photoelectric conversion layer 290 may include, but is not limited to, for example, $CsSnI_3$, $CsSnBr_3$, $CsSnCl_3$, $CH_3NH_3SnBr_3$, $CH_3NH_3SnI_3$, $HC(NH_2)_2SnI_3$, or any combination thereof.

FIG. 38 is a cross-sectional view showing another example of a unit pixel group of the image sensor of FIG. 35. Referring to FIG. 38, the image sensor 300 includes a substrate 310, a color filter array 100, a visible light sensing device 200-1, and a second light sensing device 400-2.

The substrate 310 may be a semiconductor substrate, for example, a silicon substrate. The substrate 310 may be, for example, a CMOS substrate and may include a CMOS circuit unit. The substrate 310 may include charge storages 260a, 260b, and 260c and a transmission transistor (not shown). The charge storages 260a, 260b, and 260c are electrically connected to a visible light sensing device 200-1, which will be described later. A metal wire (not shown) and a pad (not shown) may be formed on or under the substrate 310.

The color filter array 100 is the same as described above, except that the color filter array 100 may include fewer different color filters, for example including first and third color filters 110a and 110c and excluding second color filters 110b. Each pixel 300a and 300c may correspond to each section 121, and each color filter 110 may be included in each pixel 300a and 300c. In other words, the first and third pixels 300a and 300c may respectively correspond to each of the first and third sections 121a and 121c and respectively include the first and third color filters 110a and 110c. Even though in the drawing, the color filter array 100 shown in FIG. 2 is drawn, the present inventive concepts are not limited thereto, and the color filter array 100 shown in FIG. 13 may be applied.

The visible light sensing device 200-1, which may be collectively referred to as a first photo-sensing device, may be the same as the aforementioned photo-sensing device 200, except the visible light sensing device 200-1 may be configured detect light in the second wavelength spectrum, while the second visible light sensing device 400-2 may be configured to detect light in the first and third light spectra. As shown, the color filter array 100 may be between the visible light sensing device 200-1 and the substrate 310, and the visible light sensing device 200-1 may be configured to sense light prior to the light passing through the color filter array 100 and convert the sensed (e.g., detected) light into an electrical signal. The visible light sensing device 200-1 may be a photoelectric conversion diode, and may include a first photo-sensing devices 200a overlapped with the first color filters 110a, and third photo-sensing devices 200c overlapped with the third color filters 110c. The first photo-sensing device 200a and the third photo-sensing device 200c may include each of lower electrodes 210a, 210b, and 210c, upper electrodes 220, photoelectric conversion layers 230, and charge auxiliary layers 240 and 250. The detailed description thereof is the same as described above.

The photoelectric conversion diode may be configured to sense light of a particular wavelength spectrum, which may be different from the first and third wavelength spectra that are selectively transmitted by the first and third color filters 110a and 110c. For example, the photoelectric conversion layer 230 may be configured to selectively absorb green light, and the first and third color filters 110a and 110c may be configured to selectively transmit different ones of red light and blue light, respectively.

The second visible light sensing device 400-2 may be integrated in the substrate 310 and may include, for example, a plurality of silicon photodiodes and may be collectively referred to, in some example embodiments, as a second photo-sensing device. The second visible light sensing device 400-2 may be formed to have a thickness configured to absorb light of the visible wavelength spectrum in the substrate 310. The second visible light sensing device 400-2 may include silicon photodiodes 400-2a and 400-2c that are configured to sense light passing the visible light sensing device 200-1 and the color filter array 100. Each photodiode 400-2a and 400-2c may absorb and photoelectrically convert light selectively transmitted by an overlying color filter of the color filter array 100. As shown, photodiodes 400-2a vertically overlapping the first color filters 110a, which are configured to selectively transmit light of the first wavelength spectrum that has passed through the visible light sensor 200-1 to the color filter array 100, may be configured to selectively absorb and photoelectrically convert light of the first wavelength spectrum. As shown, photodiodes 400-2c vertically overlapping the third color filters 110c, which are configured to selectively transmit light of the third wavelength spectrum that has passed through the visible light sensor 200-1 to the color filter array 100, may be configured to selectively absorb and photoelectrically convert light of the third wavelength spectrum. As shown, the color filters 110a and 110c may each selectively transmit light of a visible wavelength spectrum that is different from (e.g., partially or completely excludes) the one wavelength spectrum that is absorbed and photoelectrically converted by the photoelectric conversion layer 230, so that the photodiodes 400-2a and 400-2c are configured to absorb and photoelectrically convert light of various, different wavelengths that are different from the one wavelength spectrum.

The image sensor 300 according to some example embodiments may be a stacked sensor in which visible light sensors configured to sense visible light of different wavelength spectrums are stacked. Accordingly, an in-pixel image sensor that realizes an image by simultaneously sensing light in the multiple different wavelength spectra in the visible light region may be implemented. Therefore, unlike the structure in which the different visible light sensors are manufactured on separate substrates, sensitivity may be improved without increasing the size of the image sensor 300.

The aforementioned image sensor may be included in an imaging device such as a camera, and such an image sensor and/or camera may be for example applied to various electronic devices such as a smartphone, a mobile phone, a tablet PC, a laptop PC, a desktop PC, an e-book, a navigation device, a TV, a PDA (Personal digital assistant), PMP (portable multimedia player), EDA (enterprise digital assistant), a wearable computer, a wearable device for virtual reality or augmented reality, Internet of Things (IoT), Internet of Everything device (IoE), a drone, a digital camera, a door locks, a safe, automated teller machines (ATMs), a security device, a medical device, or an automotive electronic part, etc.

FIG. 39 is a schematic view of an electronic device according to some example embodiments.

Referring to FIG. 39, an electronic device 1700 may include a processor 1720, a memory 1730, and an image sensor 1740 that are electrically coupled together via a bus 1710. The image sensor 1740 may be an image sensor, photoelectric device, camera, or the like according to any of the example embodiments. The memory 1730, which may be a non-transitory computer readable medium, may store a program of instructions. The memory 1730 may be a non-volatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM). The processor 1720 may execute the stored program of instructions to perform one or more functions. For example, the processor 1720 may be configured to process electrical signals generated by the image sensor 1740. The processor 1720 may include processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processor 1720 may be configured to generate an output (e.g., an image to be displayed on a display interface) based on such as processing.

While the inventive concepts have been described in connection with what is presently considered to be practical example embodiments, it is to be understood that the inventive concepts are not limited to such example embodiments. On the contrary, the scope of the inventive concepts are intended to cover various modifications and equivalent arrangements included within the spirit and scope of the appended claims.

What is claimed is:

1. A color filter array, comprising:
   a partition wall defining a plurality of sections that are partitioned from each other by the partition wall, the plurality of sections including a first section, a second section, and a third section; and
   a first color filter in the first section and configured to selectively transmit light in a first wavelength spectrum, a second color filter in the second section and configured to selectively transmit light in a second wavelength spectrum, and a third color filter in the third section and configured to selectively transmit light in a third wavelength spectrum, the first wavelength spectrum, the second wavelength spectrum, and the third wavelength spectrum being different from each other and belonging to a visible light wavelength spectrum,
   wherein each separate color filter of the first color filter, the second color filter, and the third color filter includes
      a colored layer in a separate, respective section of the first section, the second section, and the third section, the colored layer including a colorant defining a respective wavelength spectrum of the first wavelength spectrum, the second wavelength spectrum, and the third wavelength spectrum, and
      a transparent resin layer on the colored layer in the separate, respective section,
   wherein the colored layer excludes any crosslinked product of any crosslinkable monomer, and
   wherein the color filter array further includes a planarization layer, the planarization layer isolating transparent resin layers of separate, respective sections of the plurality of sections from each other.

2. The color filter array of claim 1, wherein a content of the colorant in the colored layer is about 50 wt % to about 95 wt % based on a total weight of the colored layer.

3. The color filter array of claim 2, wherein
   the colored layer further comprises a binder, a dispersant, or any combination thereof, and
   a total content of the colorant and the binder, the dispersant, or the any combination thereof is about 90 wt % to about 100 wt % based on the total weight of the colored layer.

4. The color filter array of claim 1, wherein the transparent resin layer comprises a crosslinked polymer, and an average light transmittance of the transparent resin layer is about 90% to about 100% in a wavelength spectrum of about 400 nm to about 700 nm.

5. The color filter array of claim 1, wherein a solubility in an alkali solvent of the transparent resin layer is less than about 1 g/1 kg.

6. The color filter array of claim 1, wherein a refractive index of the transparent resin layer is higher than a refractive index of the colored layer.

7. The color filter array of claim 6, wherein the refractive index of the colored layer is higher than a refractive index of the partition wall.

8. The color filter array of claim 1, wherein a thickness of the colored layer of the each separate color filter is about 70% to about 99% of a thickness of the each separate color filter.

9. The color filter array of claim 1, wherein
   a thickness of the colored layer is about 300 nm to about 600 nm, and
   a thickness of the transparent resin layer is less than about 200 nm.

10. The color filter array of claim 1, further comprising a hardmask layer on the transparent resin layer of the each separate color filter.

11. The color filter array of claim 10, wherein
    a refractive index of the hardmask layer is higher than a refractive index of the transparent resin layer, and
    the refractive index of the transparent resin later is higher than a refractive index of the colored layer.

12. An image sensor, comprising:
    a substrate;
    the color filter array of claim 1 on the substrate; and
    a photo-sensing device overlapped with the color filter array.

13. The image sensor of claim 12, wherein the photo-sensing device comprises a photodiode integrated in the substrate.

14. The image sensor of claim 12, wherein
    the photo-sensing device comprises a photoelectric conversion device above or beneath the color filter array, and
    the photoelectric conversion device comprises
       a first electrode and a second electrode facing each other, and
       a photoelectric conversion layer between the first electrode and the second electrode, the photoelectric conversion layer comprising an organic light absorbing material, an inorganic light absorbing material, an organic-inorganic light absorbing material, perovskite, or any combination thereof.

15. The image sensor of claim 12, wherein
    the photo-sensing device comprises a first photo-sensing device and a second photo-sensing device stacked along a thickness direction of the substrate, the first photo-sensing device is configured to sense light of the visible light wavelength spectrum, the second photo-sensing device is configured to sense light of an infrared light wavelength spectrum, and at least one of the first photo-sensing device or the second photo-sensing device comprises a perovskite structure material.

16. A camera comprising the image sensor of claim 12.

17. An electronic device comprising the image sensor of claim 12.

18. A color filter array, comprising:

a partition wall defining a plurality of sections; and a color filter in each separate, respective section of the plurality of sections, the color filter configured to selectively transmit light in a wavelength spectrum belonging to a limited portion of a visible light wavelength spectrum, wherein the color filter includes a colored layer in the each separate, respective section, the colored layer including a colorant defining the wavelength spectrum, and a transparent resin layer on the colored layer in the each separate, respective section, wherein the colored layer excludes any crosslinked product of any crosslinkable monomer, and wherein the color filter array further includes a planarization layer, the planarization layer isolating transparent resin layers of separate, respective sections of the plurality of sections from each other.

* * * * *